(12) United States Patent
Ogino

(10) Patent No.: US 7,498,729 B2
(45) Date of Patent: Mar. 3, 2009

(54) OPTICAL DEVICE

(75) Inventor: Shigeru Ogino, Laguna Niguel, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 11/464,710

(22) Filed: Aug. 15, 2006

(65) Prior Publication Data

US 2007/0040481 A1 Feb. 22, 2007

Related U.S. Application Data

(60) Provisional application No. 60/708,488, filed on Aug. 16, 2005, provisional application No. 60/728,132, filed on Oct. 19, 2005.

(51) Int. Cl.
*H01L 41/08* (2006.01)
(52) U.S. Cl. .................................... 310/800
(58) Field of Classification Search ............... 310/800, 310/328, 330, 311; 359/557, 824, 823
See application file for complete search history.

(56) References Cited

U.S. PATENT DOCUMENTS 4,302,830 A * 11/1981 Hamaoka et al. ............ 359/824
5,225,941 A * 7/1993 Saito et al. .................. 310/311
5,768,016 A * 6/1998 Kanbara ...................... 359/557
6,809,462 B2 10/2004 Pelrine et al.
6,891,317 B2 5/2005 Pei et al.

OTHER PUBLICATIONS

Yoseph Bar-Cohen, Electroactive Polymer (EAP) Actuators as Artificial Muscles, book, 2004, pp. 22-31, pp. 535-539, The Society of Photo-Optical Instrumentation Engineers, United States of America.
John D. W. Madden, Artificial Muscle Technology: Physical Principles and Naval Prospects, IEEE Journal of Oceanic Engineering, Jul. 2004, vol. 29 No. 3, pp. 207-728, IEEE, United States of America.
Steven Ashley, Artifical Muscles, Scientific American, Oct. 2003, Scientific American, Inc., United States of America.

* cited by examiner

*Primary Examiner*—Thomas M Dougherty
*Assistant Examiner*—Karen B Addison
(74) *Attorney, Agent, or Firm*—Canon USA Inc IP division

(57) ABSTRACT

An optical device includes a lens holder that holds a lens and is movable in the optical-axis direction of the lens, and an actuator that moves the lens holder in the optical-axis direction. The actuator includes an actuator element composed of an electroactive polymer, an actuator-element holder that holds the actuator element, a mechanism that applies pre-strain to the actuator element, and a connecting member that connects the lens holder and the actuator. Herein, a connecting portion of the connecting member is disposed adjacent to the side surface of the actuator.

6 Claims, 25 Drawing Sheets

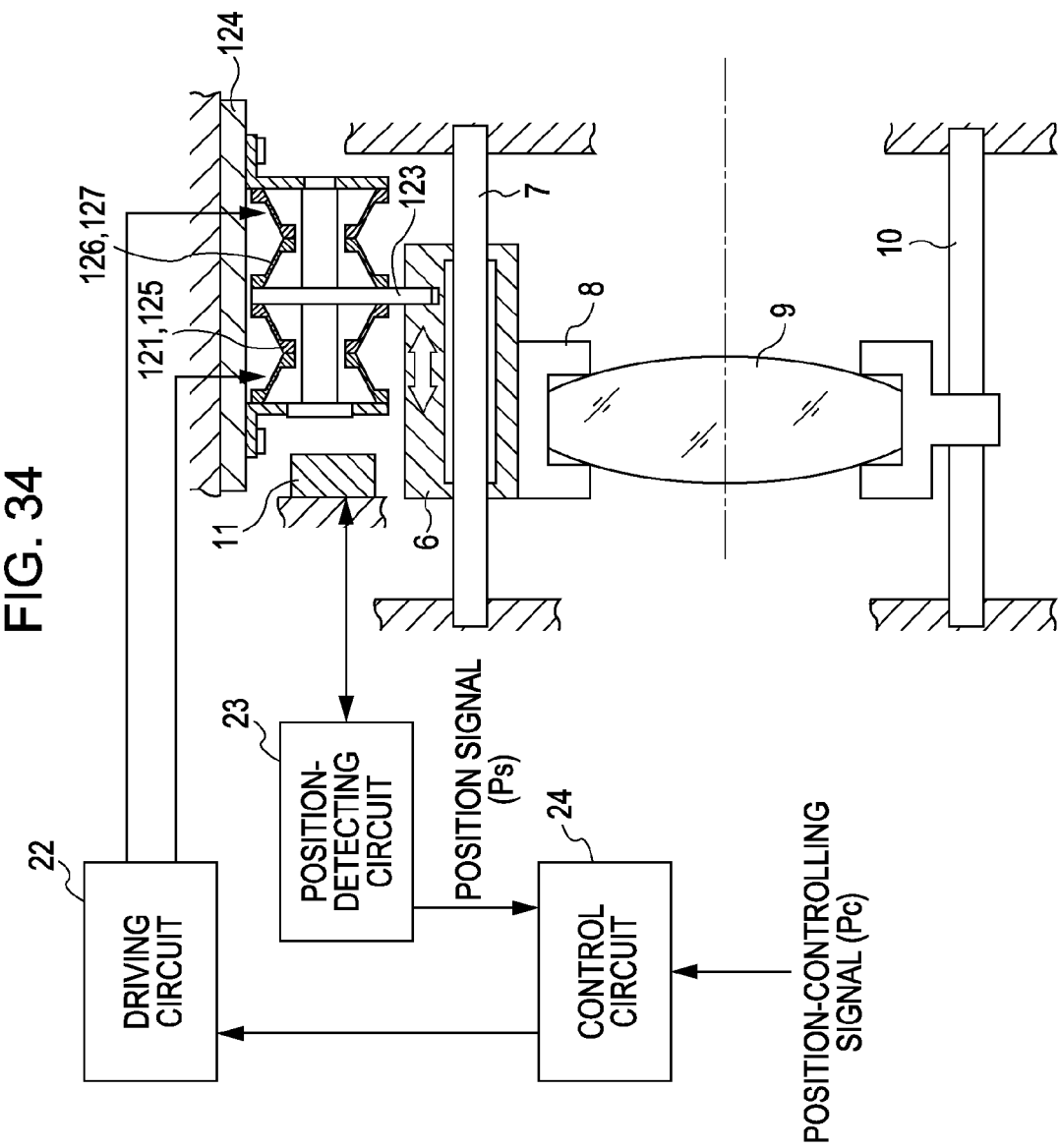

OPTICAL DEVICE

CROSS-REFERENCE TO RELATED APPLICATION

This application claims the benefit of U.S. Provisional Application No. 60/708,488, filed Aug. 16, 2005 and U.S. Provisional Application No. 60/728,132, filed Oct. 19, 2005, which are hereby incorporated by reference in their entirety.

BACKGROUND OF THE INVENTION

1. Field of the Invention

The present invention relates to image-forming apparatuses such as video cameras and electronic still cameras, and in particular, relates to optical devices using electroactive polymer actuators.

2. Description of the Related Art

There has been significant size reduction of video cameras and electronic still cameras in recent years. At the same time, ultrasmall camera units for cellular phones and the like have been developed in succession, and the demand for smaller image-capturing lens units is increasing.

To date, electromagnetic motors have been generally used as actuators for driving movable lenses and light-adjusting diaphragms for autofocusing, zooming, stabilizing images, and adjusting light amounts in video cameras and electronic still cameras. A plurality of electromagnetic motors are installed in a lens barrel, and a reduction in space occupied by the motors in the lens barrel is required as the lens becomes smaller with reduction in image size.

The electromagnetic motors include magnets and coils. Force that is generated by energizing the coils in magnetic fields in accordance with Fleming's rule and mutually acts on the magnets and coils is utilized as a driving force. In order to reduce the size of the actuators, the driving force per volume of the actuators needs to be increased. To that end, the current passing through the electromagnetic actuators and the magnetic fields generated by the magnets need to be increased.

Specifically, the wire diameter of the coils may be increased so as to allow passage of higher current, the winding number of the coils may be increased, or the size of the magnets may be increased so as to increase magnetic flux density. However, each measure may cause an increase in the size of the motors, and does not match the tendency toward smaller image-forming apparatuses in recent years.

When a large load is driven by a small driving force, both a decelerating mechanism and a mechanical lever are utilized in general. When a decelerating mechanism is employed, driving noise of the motor and noise of gears of the decelerating mechanism are disadvantageously generated since the motor drives at a speed higher than that of the load. Moreover, mechanical components added to the decelerating mechanism and the lever may prevent size reduction and low costs, and may impair durability due to mechanical sliding portions thereof.

Recently, research studies on high-polymer materials having large strain and output force per volume have been lively conducted with the aim of using such materials as artificial muscle and the like. Actuators utilizing these materials directly transmit the strain of the materials to loads so as to drive the loads by using the markedly large strain of the materials compared with that of known piezoelectric materials such as lead zirconate titanate (PZT), and do not require decelerating mechanisms or the like.

These materials include those in a category referred to as so-called electroactive polymers, which typically include dielectric elastomers, ferroelectric polymers, liquid-crystal elastomers, electrostrictive polymers, and the like (In *Electro Active Polymers (EAP) as Artificial Muscles, Reality Potential and Challenges,* 2nd ed.; Y. Bar-Cohen, Ed., SPIE Press: Bellingham, Wash., 2004; pp 22-31).

In these materials, dielectric elastomers include those of an acrylic type and of a silicone type. Some acrylic dielectric elastomers having a strain of 380% or more attract considerable attention. Moreover, since the dielectric elastomers have an output force per volume that is one to two orders of magnitude larger than that of known electromagnetic motors, the volume of the actuators is expected to be reduced to one tenth or less that of the electromagnetic motors. Due to the large output force and strain, the above-described decelerating mechanisms and mechanical levers are not required, and thus silent and durable actuators can be realized.

Operating principles of the dielectric elastomers will now be described by taking a flat dielectric elastomer film as an example (J. D. W. Madden; *Artificial Muscle Technology: Physical Principles and Naval Prospects*; IEEE Journal of Oceanic Engineering; July 2004, Vol. 29, No. 3).

A flat dielectric elastomer film interposed between two electrodes is compressed in the direction of an electric field by an electrostatic force between the electrodes generated when a voltage is applied to the electrodes (Maxwell's stress), and at the same time, is expanded in the direction perpendicular to the electric field so as to generate a pressure P. The pressure P can be represented by Expression 1 shown below (In *Electro Active Polymers (EAP) as Artificial Muscles, Reality Potential and Challenges,* 2nd ed.; Y. Bar-Cohen, Ed., SPIE Press: Bellingham, Wash., 2004; pp 535-538). The pressure P is utilized as the driving force of an actuator. As is clear from Expression 1, materials having a larger dielectric constant, a smaller gap between the electrodes, and a larger driving voltage can increase the driving force.

$$P = \epsilon_r \epsilon_0 (V/t)^2 \quad (1)$$

where, $\epsilon_r$, $\epsilon_0$, V, and t indicate the relative dielectric constant, the dielectric constant in a vacuum ($8.85 \times 10^{-12}$ F/m), the voltage between the electrodes, and the gap between the electrodes, respectively.

Moreover, the relationship between the displacement of the film and the load can be represented by Expression 2 shown below (In Electro Active Polymers (EAP) as Artificial Muscles, Reality Potential and Challenges, 2nd ed.; Y. Bar-Cohen, Ed., SPIE Press: Bellingham, Wash., 2004; pp 535-538).

$$\Delta l = l(0.5P - F/wt)/Y \quad (2)$$

where, $\Delta l$, l, P, F, w, t, and Y indicate the displacement of the actuator in a direction along which the force is obtained (extension of the film), the initial length of the film, the generated pressure (Expression 1), the load, the width of the film, the thickness of the film, and Young's modulus, respectively.

The electrodes composed of an elastic material such as carbon are formed on the dielectric elastomer film. Acrylic dielectric elastomers (VHB4910 of 3M make, for example) and silicone dielectric elastomers are commercially available.

U.S. Pat. No. 6,891,317 discloses a cylindrical actuator including a thin film of such a dielectric elastomer wound around a helical compression spring. This circular actuator functions as a one-dimensional linear actuator that extends or contracts in the axial direction and also as a two-dimensional bending actuator whose top portion bends. Furthermore, a so-called push-pull actuator including two such cylindrical polymer actuators is described in Science American (October 2003, p 58). The helical compression spring applies a predetermined extension (prestrain) to the dielectric elastomer film in the circumferential direction and in the axial direction beforehand such that the electrostatic breakdown strength of the film is increased. Higher voltage can be applied to the film as the strength thereof is increased, and as a result, a small and reliable actuator having an increased driving force can be realized. The electrostatic breakdown strength is 110 to 350 MV/m for silicone dielectric elastomers, and 125 to 440 MV/m for acrylic dielectric elastomers (J. D. W. Madden; Artificial Muscle Technology: Physical Principles and Naval Prospects; IEEE Journal of Oceanic Engineering; July 2004, Vol. 29, No. 3).

Moreover, U.S. Pat. No. 6,809,462 discloses an application of a dielectric elastomer as a displacement-detecting sensor by detecting changes in electrical properties such as the capacitance and resistance of the elastomer caused by the deformation of the elastomer. However, methods for detecting changes in capacitance and the like are not limited to this, and other methods using, for example, high-frequency resonators of an RCA type are widely known. Moreover, changes in electrical properties including resistance can be detected using known detecting circuits. Furthermore, composites including actuators and sensors deposited on each other using piezoelectric elements are also widely known.

Application of the cylindrical actuator according to U.S. Pat. No. 6,891,317 to an actuator for driving a lens leads to the following problems:

1. Output can only be transmitted via the end portion of the cylinder.
2. The helical compression spring is disposed inside the cylindrical film.
3. No guiding mechanism in the direction along which the force is obtained is provided.

The first problem is that the layout of the actuator installed inside a lens barrel is performed with low flexibility. Moreover, when the lens is driven by the cylindrical actuator whose force is output from the end portion, a space is required on one side of the lens for the cylindrical actuator. Therefore, even when the size of the cylindrical actuator is reduced compared with electromagnetic actuators, the merit may not be utilized in terms of layout.

The second problem is that the dielectric elastomer film is disposed on the outer circumference of the spring, and the film is deformed along the outside shape of the spring due to the small stiffness of the film. Furthermore, the spring and the film relatively slide on each other when the film extends or contracts. The deformation and the sliding may exert detrimental effects on driving performance characteristics such as hysteresis and repeatability, durability, and reliability characteristics such as electrostatic breakdown strength.

Moreover, the total length of the rolled actuator is determined by the balance of the force between the spring and the film, and the tolerance and the temperature of the film and the spring have profound effects on the total length since the film and the spring are in contact with and slide on each other as described above. Thus, the control of tolerance of the total length becomes difficult. This means that characteristics such as strain and driving force may vary more widely with the variation of the total length.

The third problem is that driving force in a predetermined direction is not stabilized since no guiding mechanism in the direction along which the force is obtained is provided. This may also exert detrimental effects on the driving performance as in the second problem.

SUMMARY OF THE INVENTION

The present invention provides an optical device including electroactive polymer actuators for driving lenses having high flexibility regarding the layout of the actuator installed inside a lens barrel and having excellent driving characteristics.

The optical device according to the present invention includes a lens holder that holds a lens and is movable in the optical-axis direction of the lens, and an actuator that moves the lens holder in the optical-axis direction. The actuator includes an actuator element composed of an electroactive polymer, an actuator-element holder that holds the actuator element, a mechanism that applies prestrain to the actuator element, and a connecting member that connects the lens holder and the actuator. Herein, a connecting portion of the connecting member is disposed adjacent to the side surface of the actuator.

Further features of the present invention will become apparent from the following description of exemplary embodiments with reference to the attached drawings.

BRIEF DESCRIPTION OF THE DRAWINGS

FIG. 34 illustrates a lens-driving mechanism according to the seventh exemplary embodiment of the present invention.

DESCRIPTION OF THE EMBODIMENTS

Figure 24:
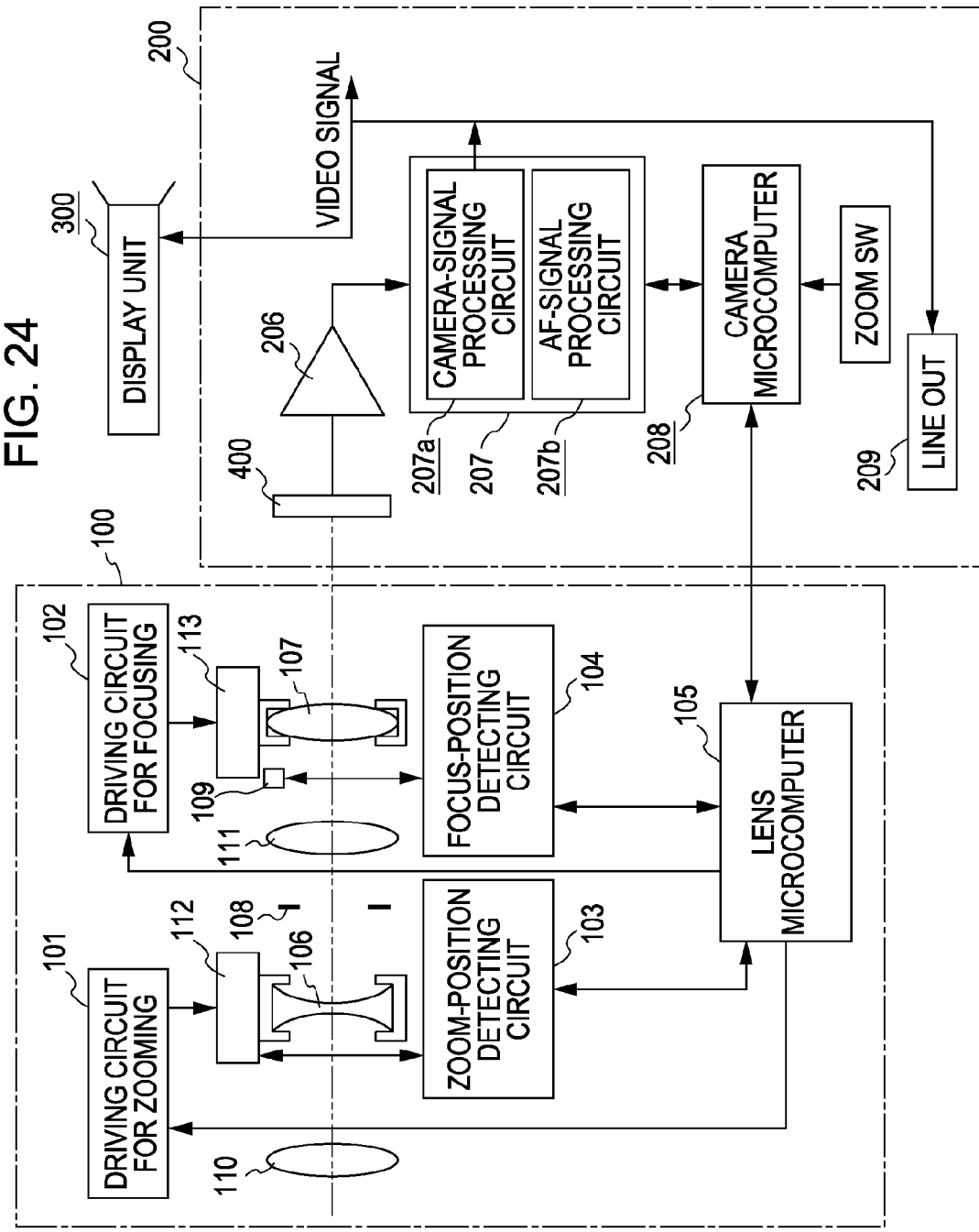
FIG. 24 illustrates an optical device according to an exemplary embodiment of the present invention.

An optical device including electroactive polymer actuators for driving lenses according to an exemplary embodiment of the present invention will now be described with reference to FIG. 24.

The optical device according to this exemplary embodiment includes an image-taking lens unit 100, a camera unit 200, and a display unit 300. The image-taking lens unit 100 focuses images of objects to be captured on an image-pickup device 400 such as a charge-coupled device (CCD) or a complementary metal-oxide semiconductor (CMOS). Output signals from the image-pickup device 400 are converted into predetermined video signals of, for example, the National Television System Committee (NTSC) format, the Phase Alternation by Line (PAL) format, or the Moving Picture Experts Group (MPEG) format by a camera-signal processing circuit 207a. The video signals are displayed on the display unit 300 such as a liquid-crystal display (LCD) and an electric view finder (EVF) such that a photographer can view the images. Moreover, the video signals can be stored in recording media such as videotapes, solid-state memories such as Compact Flash cards, and digital versatile discs (DVDs) using a recording unit (not shown).

The image-taking lens unit 100 includes lens groups 106, 107, 110, and 111 each including one or more lenses. The lens configuration according to this exemplary embodiment includes the four lens groups of positive, negative, positive, and positive lenses in this order, what is called a rear-focus zoom lens. However, the lens configuration is not limited to this. The image-taking lens unit 100 further includes a diaphragm unit 108 such as an iris galvano meter (IG meter) for adjusting light amounts, electroactive polymer actuators 112 and 113 according to this exemplary embodiment, and driving circuits 101 and 102 for the respective polymer actuators. The driving circuits 101 and 102 include boosting circuits such as DC/DC converters (not shown), and can supply voltages of up to several kilovolts to the actuators. A lens microcomputer 105 controls the drive of these driving circuits. Moreover, the image-taking lens unit 100 includes sensors and detecting circuits 103 and 104 for detecting the positions of the movable lenses 106 and 107, respectively. In this exemplary embodiment, a non-contact optical encoder 109 is used for the sensor for detecting the position of the focus lens 107. Moreover, the position of the zoom lens 106 is detected by detecting changes in an electrode interval caused by voltage applied to actuator elements in the form of changes in capacitance or resistance of the actuator elements using known circuits of a resonator type, and then by converting the changes into the displacement of the actuator and the position of the lens as disclosed in, for example, U.S. Pat. No. 6,809,462. The sensor is integrated with the actuator. The lens microcomputer 105 controls the drive of the zoom lens 106 and the focus lens 107 in accordance with control signals for zooming and focusing, respectively, output from a camera microcomputer 208.

Next, structures and operations of electroactive polymer actuators for driving lenses of optical devices according to individual embodiments will be described. The same reference numerals are used for components common to the exemplary embodiments.

First Exemplary Embodiment

FIGS. 1 to 5 illustrate structures of actuators according to a first exemplary embodiment.

Cylindrical actuator elements 1 and 1' are composed of an electroactive polymer. In this exemplary embodiment, the material may be an acrylic or silicone dielectric elastomer disclosed in U.S. Pat. No. 6,891,317, or may have properties shown in Table 1 (J. D. W. Madden; *Artificial Muscle Technology: Physical Principles and Naval Prospects*; IEEE Journal of Oceanic Engineering; July 2004, Vol. 29, No. 3). However, the material is not limited to these.

Holding members 2, 3, and 5 are mechanical components for holding the actuator elements 1 and 1', and are bonded to either end of the actuator elements 1 and 1'. Moreover, the holding members 2 and 5 include keys 12 and 13, respectively, that are mechanically connected to loads. In this exemplary embodiment, the driving force of the actuators is transmitted via the keys 12 and 13. Flat plates 4 apply prestrain to the actuator elements 1 and 1', and are longer than the actuators shown in FIGS. 2 and 4 by a predetermined amount. Moreover, in this exemplary embodiment, the actuator elements 1 and 1' have the same length, but may have lengths different from each other according to apparatuses including the actuators.

Figure 1:
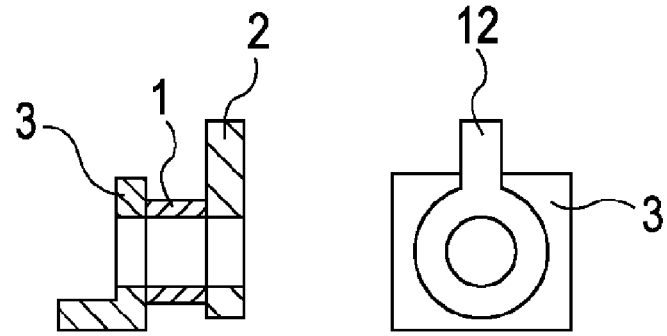
FIGS. 1 to 13 illustrate the structures of actuators according to first to fourth exemplary embodiments of the present invention.
Figure 2:
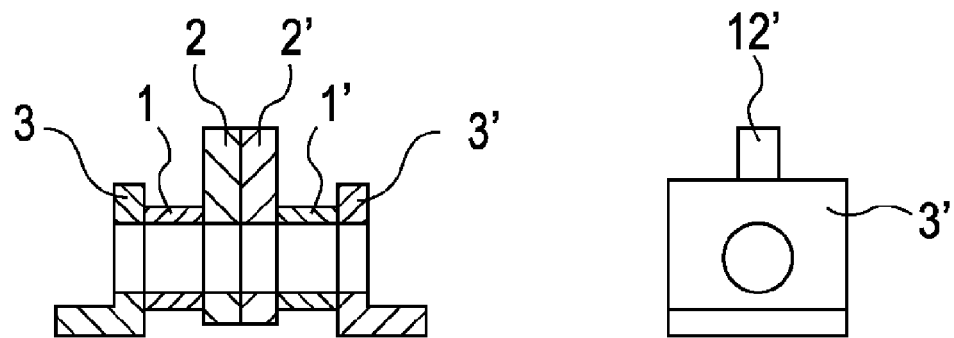
Figure 3:
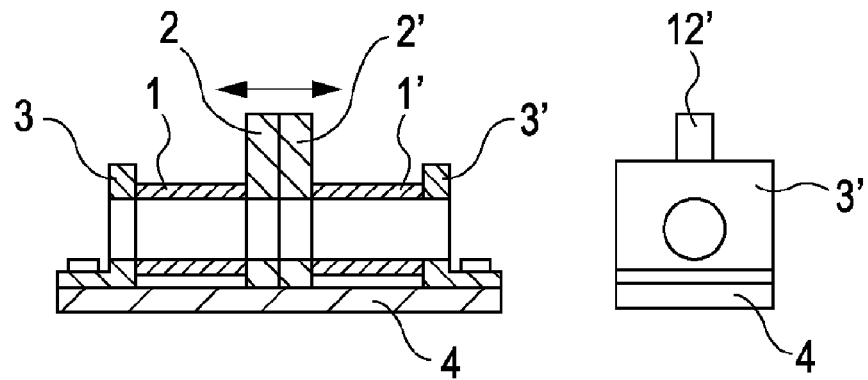
Figure 4:
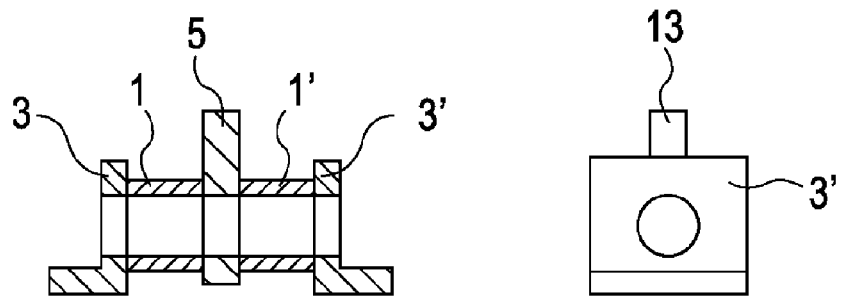
Figure 5:
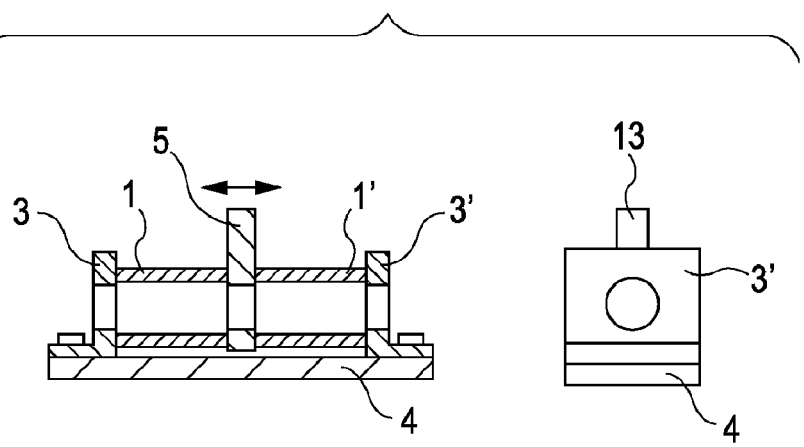

The actuator shown in FIG. 2 includes two identical components shown in FIG. 1, whereas the actuator shown in FIG. 4 includes the actuator elements 1 and 1' bonded to the holding member 5 so as to form a unit. The actuator shown in FIG. 4 can be reduced in size since the holding member 2' is omitted. The unit shown in FIG. 4 is employed in other exemplary embodiments of the present invention, but the actuator including two components bonded to each other so as to form a unit as shown in FIG. 2 may be employed.

As described above, predetermined prestrain applied to actuator elements can improve the actuator characteristics such as electrostatic breakdown strength. In this exemplary embodiment, prestrain in the axial direction is applied to the units shown in FIGS. 2 and 4 using the flat plates 4. The units shown in FIGS. 2 and 4 are fixed to the flat plates 4 by screwing the holding members 3 and 3' to the flat plates 4 while the actuator elements 1 and 1' are extended in the axial direction using fitting jigs (not shown) within a range of elastic deformation. The actuator units that are maintained in a service condition using the flat plates 4 facilitate the management of the actuator characteristics. However, the flat plates 4 according to this exemplary embodiment are not necessarily required, and the units shown in FIGS. 2 and 4 may be directly fixed to the interior of a lens barrel while the units are extended in the axial direction.

Figure 8:
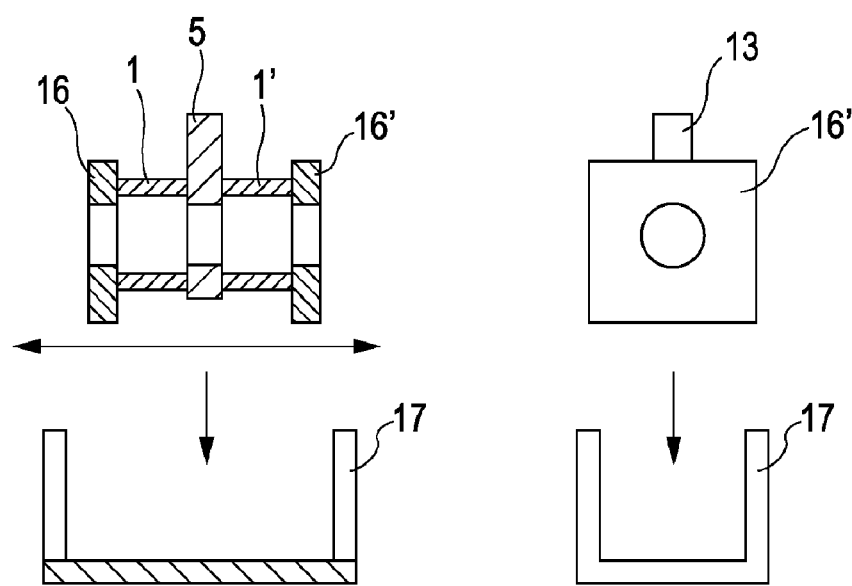
Figure 9:
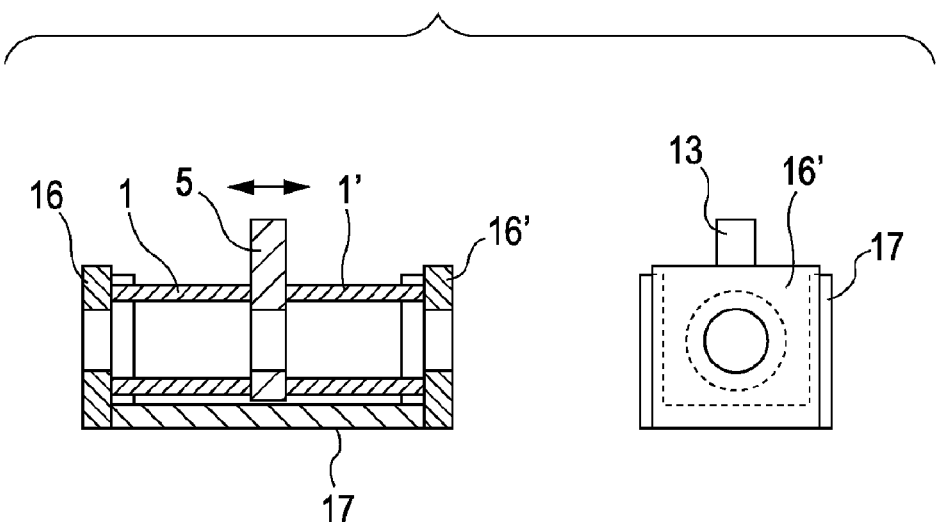

According to another embodiment, a unit can be readily prestrained by fitting the unit onto the outer edges of four pillars of a supporting member 17 shown in FIGS. 8 and 9 while the unit is extended.

Figure 13:
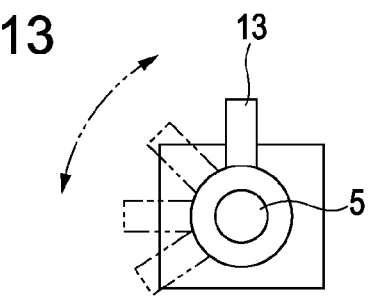
Figure 14:
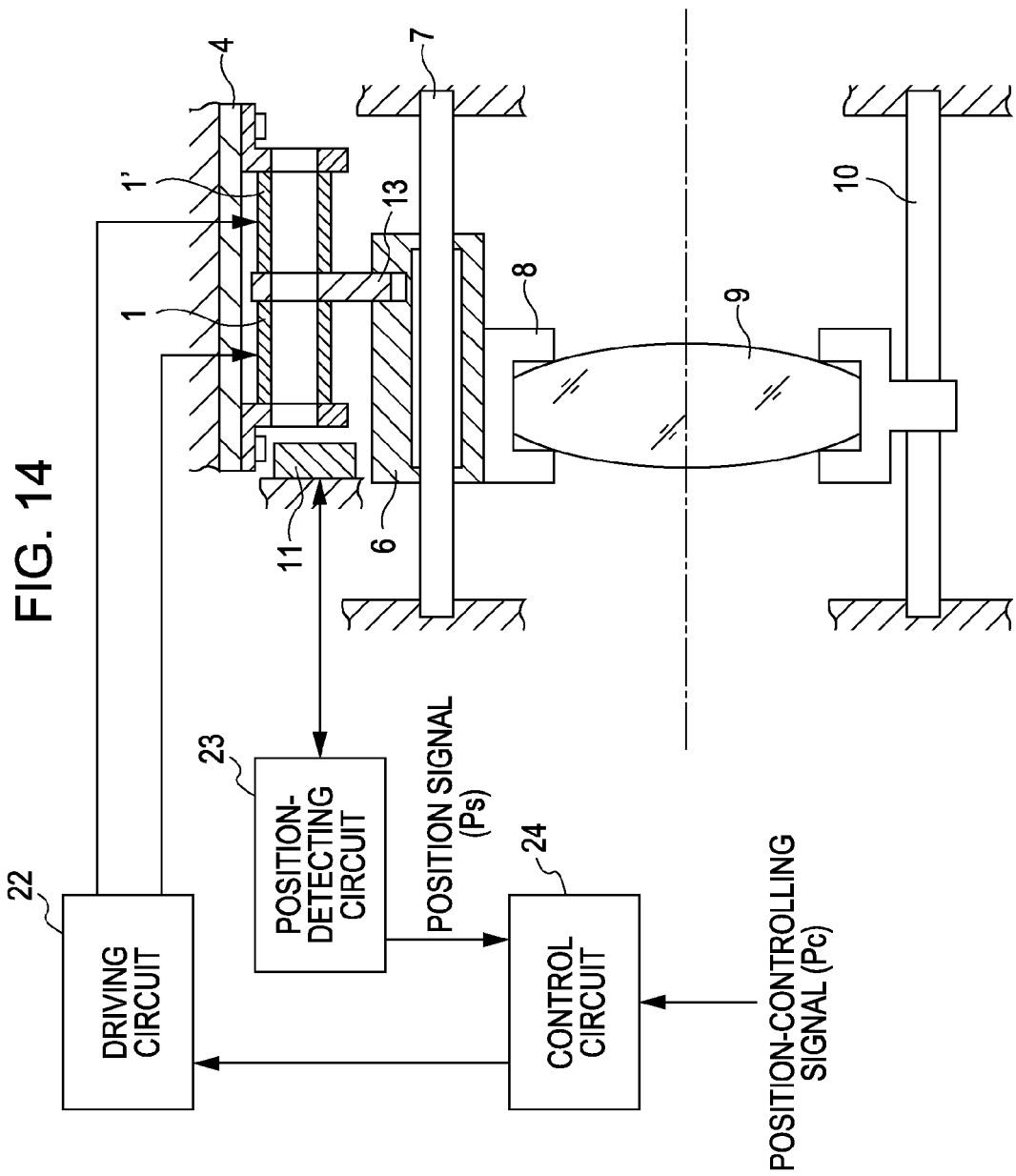
FIGS. 14 to 16 illustrate a lens-driving mechanism according to the first exemplary embodiment of the present invention.
Figure 15:
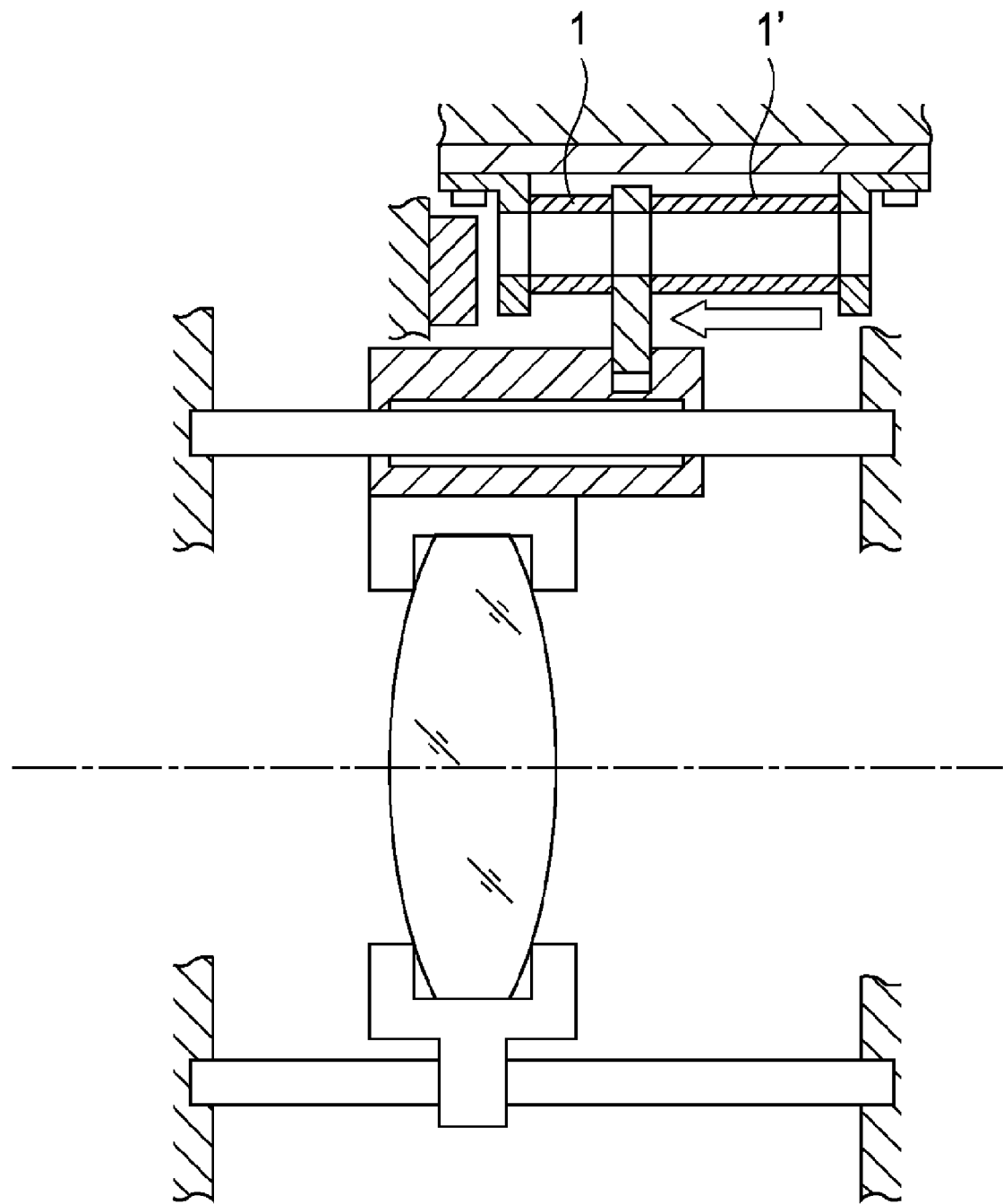
Figure 16:
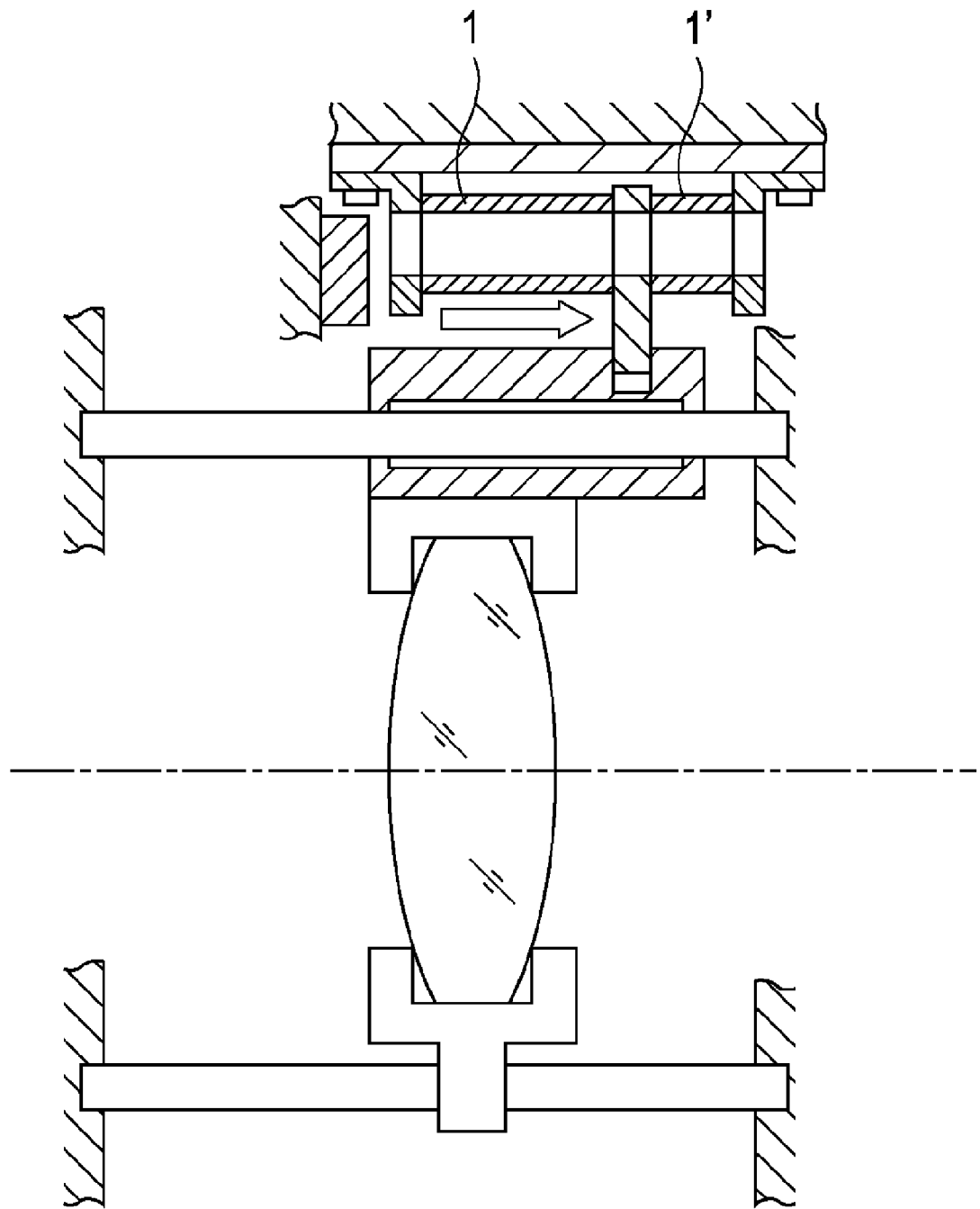

FIGS. 14 to 16 illustrate a lens-driving mechanism including a polymer actuator unit (unit shown in FIG. 5) according to this exemplary embodiment. A lens 9 held by a frame 8 can move together with a sleeve 6 along guiding shafts 7 and 10. A detecting sensor 11 detects the position of the lens. The key 13 of the holding member 5 is connected with the sleeve 6 so as to transmit the driving force of the actuator unit to the lens frame. As shown in FIG. 13, the position of the key 13 can be changed with respect to the attachment face when it is assembled into the unit shown in FIG. 4, resulting in higher flexibility regarding the shapes and the positions of the barrel and the attachment face to which the unit is attached. Moreover, the mechanism shown in this exemplary embodiment can be used for driving the above-described movable focus lens or the above-described movable zoom lens, but the application is not limited to these.

In the case of the structure according to this exemplary embodiment, results of the approximate size of the actuator calculated using the Expressions 1 and 2 described above will be described below.

The weight of a movable portion including the lens 9, the lens frame 8, and the sleeve 6 is defined as 10 g, and the movable range of the lens 9 is defined as ±0.5 mm. When the film thickness, the driving voltage, and the relative dielectric constant $\in_r$ of the film are 50 μm, 5 kV, and 3, respectively, the dimensions of the film that can move the load of 10 g by 1 mm can be roughly estimated as approximately 10 mm in length and 2 mm in width from Expressions 1 and 2. When the film is rolled into a cylinder having an internal diameter of 2 mm, the external diameter becomes approximately 3 mm. As a result, the length of the actuator unit becomes (2 mm×2 (two films))+(the total thickness of three holding members). Thus, a small actuator having a length of approximately 6 mm and an external diameter of 3 mm can be realized.

Next, operations of the lens-driving mechanism will be described with reference to FIGS. 14, 15, and 16.

FIG. 14 illustrates the structure of the lens-driving mechanism and a circuit block diagram. Voltage is applied to the actuator elements 1 and 1' by a driving circuit 22. Position-detecting circuit 23 supplies power to the detecting sensor 11 and transmits signals output from the detecting sensor 11 to a control circuit 24. The detecting sensor 11 may be an external type such as a photodetector, or may be an embedded type such as a capacitance detector described above. The control circuit 24 monitors signals output from the position-detecting circuit 23, and controls voltage that is applied to the actuator elements 1 and 1' on the basis of signals for controlling the lens position. The signals for controlling the lens position are information on the target position of the lens for, for example, autofocusing and zooming.

Figure 23:
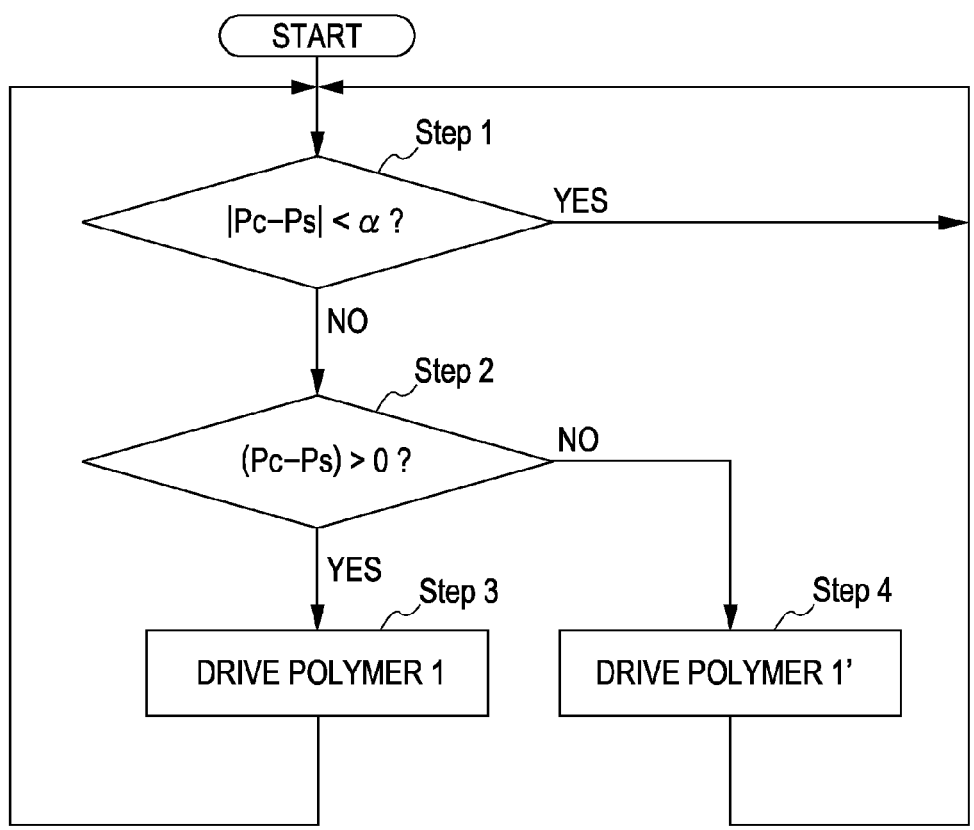
FIG. 23 is a flow chart illustrating operations of driving control according to the first exemplary embodiment of the present invention.

FIG. 23 illustrates a flow chart for controlling the position of the lens.

Step 1: The control circuit 24 compares a position-controlling signal Pc, which is the information on the target position of the lens, input to the control circuit 24 with a position signal Ps output from the position-detecting circuit 23. When the absolute value of the difference between the position-controlling signal Pc and the position signal Ps is less than a predetermined value α, the process returns to START. When the absolute value is larger than α, the process proceeds to Step 2. In the case of focusing, for example, the predetermined value α is defined by multiplying an allowable diameter of a circle of confusion by a diaphragm stop (F-number), and then multiplying the resultant value by a predetermined constant.

Step 2: When the difference between Pc and Ps is positive, a voltage is applied to the actuator element 1 for driving the lens 9 in Step 3 (state shown in FIG. 16). When the difference between Pc and Ps is negative, a voltage is applied to the actuator element 1' for driving the lens 9 in Step 4 (state shown in FIG. 15).

Steps 1 to 4 are performed at predetermined time intervals such that the actuator elements 1 and 1' are driven, thereby controlling the lens position.

Next, setting of the initial position of the actuator according to the present invention will be described.

The key 13 of the actuator according to this exemplary embodiment is connected with the sleeve 6 so as to drive the lens. In the initial state where no voltage is applied to the actuator elements 1 and 1', the lens position can be maintained by the elastic force of the actuator elements 1 and 1'. Normally, known devices for driving focus lenses return the lenses to predetermined positions (resetting operation) when powering on. The actuator according to this exemplary embodiment can omit this resetting operation. Moreover, no power is required for positioning the actuator at the initial position, resulting in power savings. In this exemplary embodiment, the initial reset position is set at the midpoint of the focus stroke. That is, the actuator is fixed to the lens barrel such that the lens position when the key 12 or 13 is connected to the sleeve 6 while no voltage is applied to the actuator is at the midpoint of the focus stroke. Similarly, another actuator is fixed to the lens barrel such that the position of the zoom lens is at the midpoint of the zoom stroke for driving the zoom lens. The initial reset position (the initial position while no voltage is applied to the actuator elements 1 and 1') is not necessarily set at the midpoint of the focus stroke, but may be set at a position other than the focus stroke.

Moreover, when the actuator is fixed inside the lens barrel, all or a part of the components of the actuator may have black matt surfaces such that light beams reflected from the actuator unit do not form ghost images.

As described above, two cylindrical polymer actuator elements 1 and 1' are connected to each other by the holding members 3, 3', 2, and 2' (or the holding member 5). Moreover, the driving force is transmitted via the key 12 (or the key 13) disposed at the side surfaces of the holding members 2 and 2' (or the holding member 5), and the actuator elements 1 and 1' are fixed while being prestrained.

According to the above-described structure, output force can be transmitted via the side surface of the actuator at the midpoint of the cylinders thereof, and the position of the key can be freely set with respect to the attachment face. With this, the layout of the actuator installed inside the lens barrel can be performed with higher flexibility, and dead space can be reduced. Thus, a small lens barrel can be realized. Moreover, removal of helical compression springs can reduce detrimental effects on driving performance characteristics such as hysteresis and repeatability, durability, and reliability characteristics such as electrostatic breakdown strength caused by the known springs. Furthermore, the connection of the key and the sleeve serving as a guiding member of the movable lens groups can stabilize the direction of force obtained from the actuator, resulting in an excellent driving performance.

Second Exemplary Embodiment

An actuator unit according to another exemplary embodiment will now be described with reference to FIGS. 6 and 7.

Figure 6:
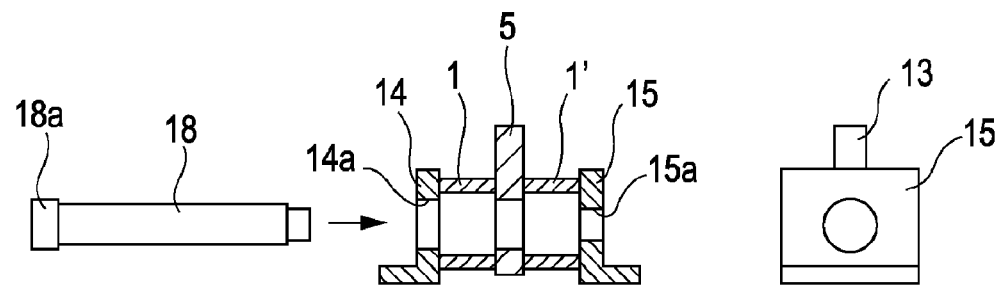
Figure 7:
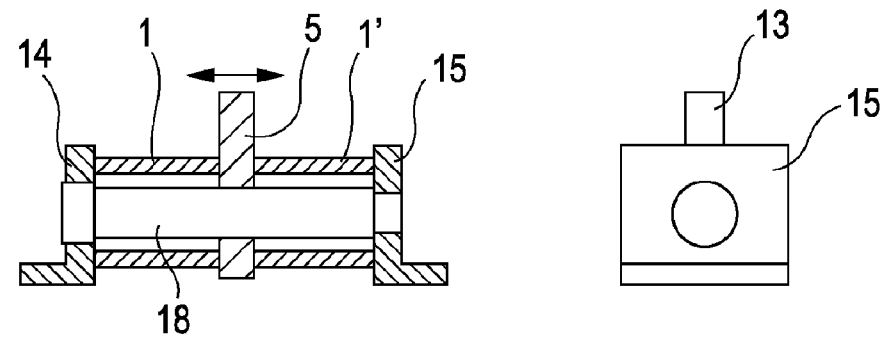

In order to prestrain the actuator elements, a stepped shaft 18 shown in FIGS. 6 and 7 may be employed in this exemplary embodiment instead of the flat plate according to the above-described exemplary embodiment.

In this case, a holding member 14 has a tapped hole 14a that is engaged with a threaded portion 18a of the stepped shaft 18. The leading end 18b of the stepped shaft 18 is fitted into a hole 15a of a holding member 15 while the threaded portion 18a proceeds into the tapped hole 14a of the holding member 14, and the stepped portion of the stepped shaft 18 presses the holding member 15. The actuator elements 1 and 1' are extended and prestrained while the threaded portion 18a further proceeds into the tapped hole 14a. The holding member 5 can slide on the stepped shaft 18. The hole of the holding member 5 and the sliding portion of the stepped shaft 18 are covered with a low-friction coating, and thus the holding member 5 can move smoothly. Moreover, the diameter of the hole 15a of the holding member 15 is larger than that of the leading end 18b of the stepped shaft 18.

According to this structure, force generated by the prestrain is applied to the holding members 14 and 15 at positions adjacent to the center line shown in FIG. 7, i.e., substantially corresponding to the position of the stepped shaft 18. Thus, the prestrained actuator elements (films) 1 and 1' do not easily produce the moment of force, and thin holding members 14 and 15 can be realized in addition to the effects of the first exemplary embodiment.

Third Exemplary Embodiment

Figure 10:
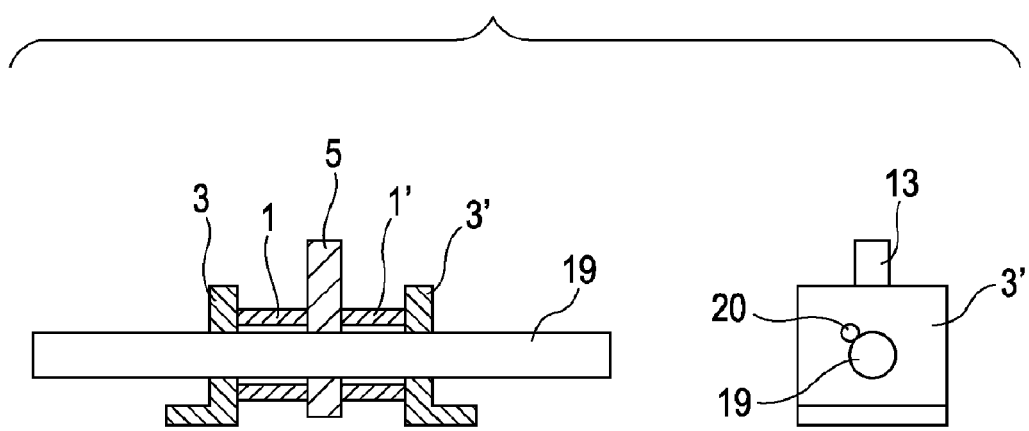
Figure 11:
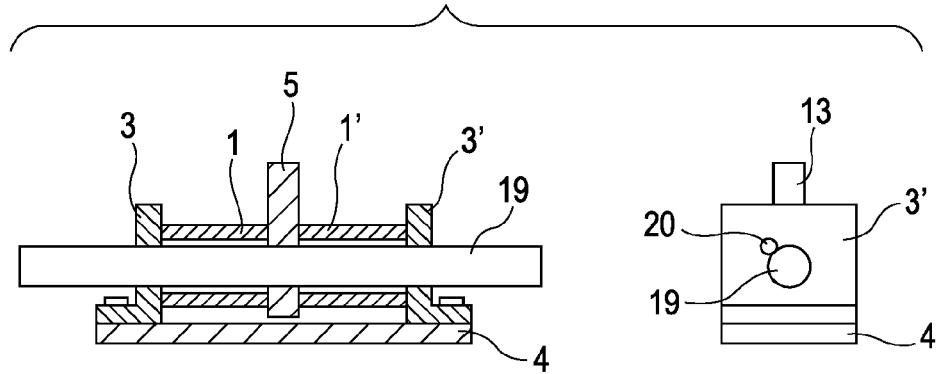

Next, a third exemplary embodiment will be described with reference to FIGS. 10, 11, 17, 18, and 19. FIGS. 10 and 11 illustrate the structure according to the third exemplary embodiment. The structure of the actuator unit according to the third exemplary embodiment is the same as that of the actuator unit according to the first exemplary embodiment shown in FIG. 4 except that the actuator unit according to the third exemplary embodiment includes a shaft 19. The shaft 19 is clamped to the holding member 5 so as to be integrated with the holding member 5. The shaft 19 is engaged with holes of the holding members 3 and 3' so as to be slidable. The holes of the holding members 3 and 3' are covered with a low-friction coating as in the second exemplary embodiment. FIG. 10 illustrates the actuator unit before the actuator elements 1 and 1' are prestrained. FIG. 11 illustrates the actuator unit when the holding members 3 and 3' are fixed to the flat plate 4 such that the actuator elements 1 and 1' are prestrained as in the first exemplary embodiment.

Figure 17:
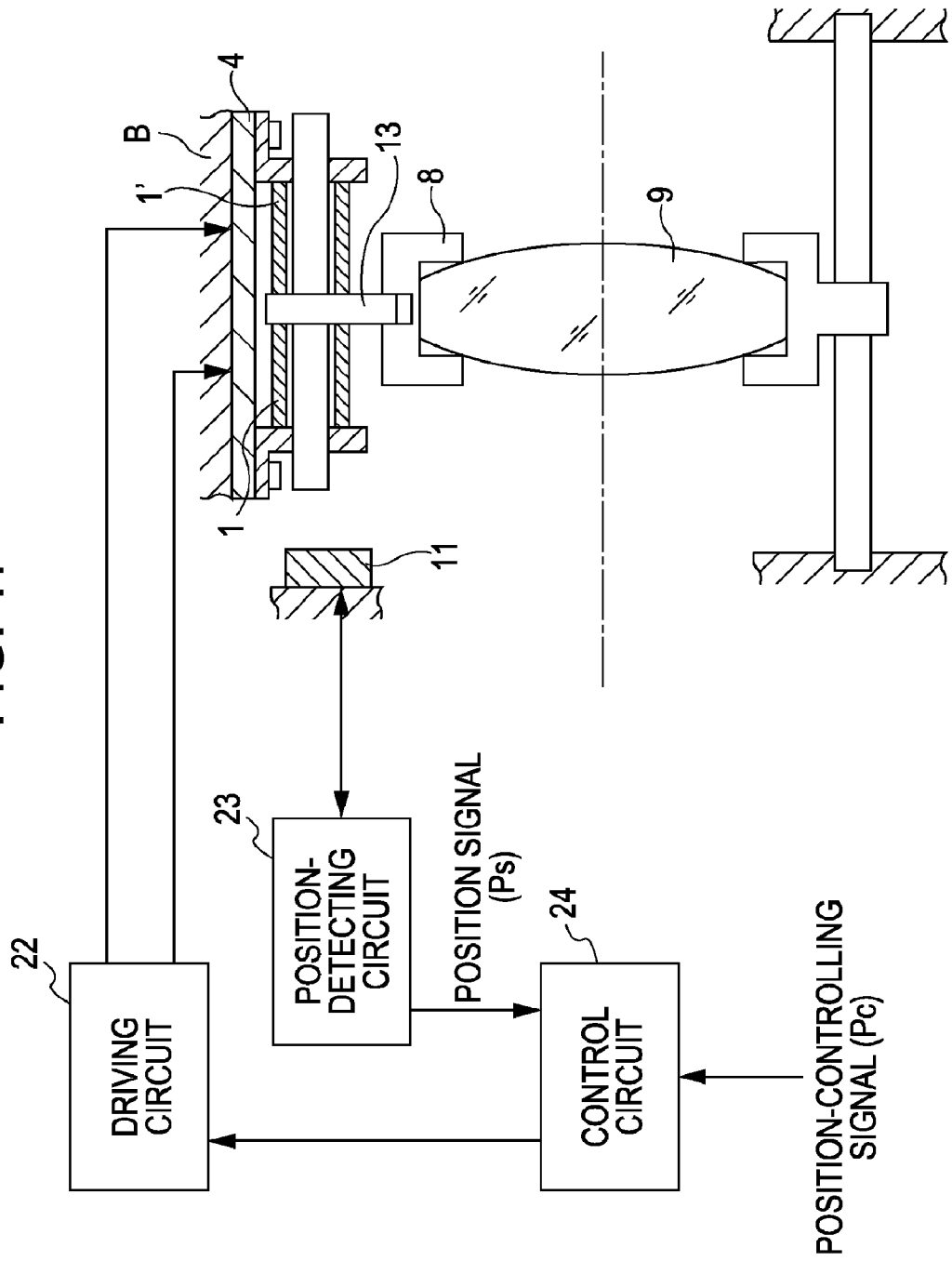
FIGS. 17 to 19 illustrate a lens-driving mechanism according to the third exemplary embodiment of the present invention.
Figure 18:
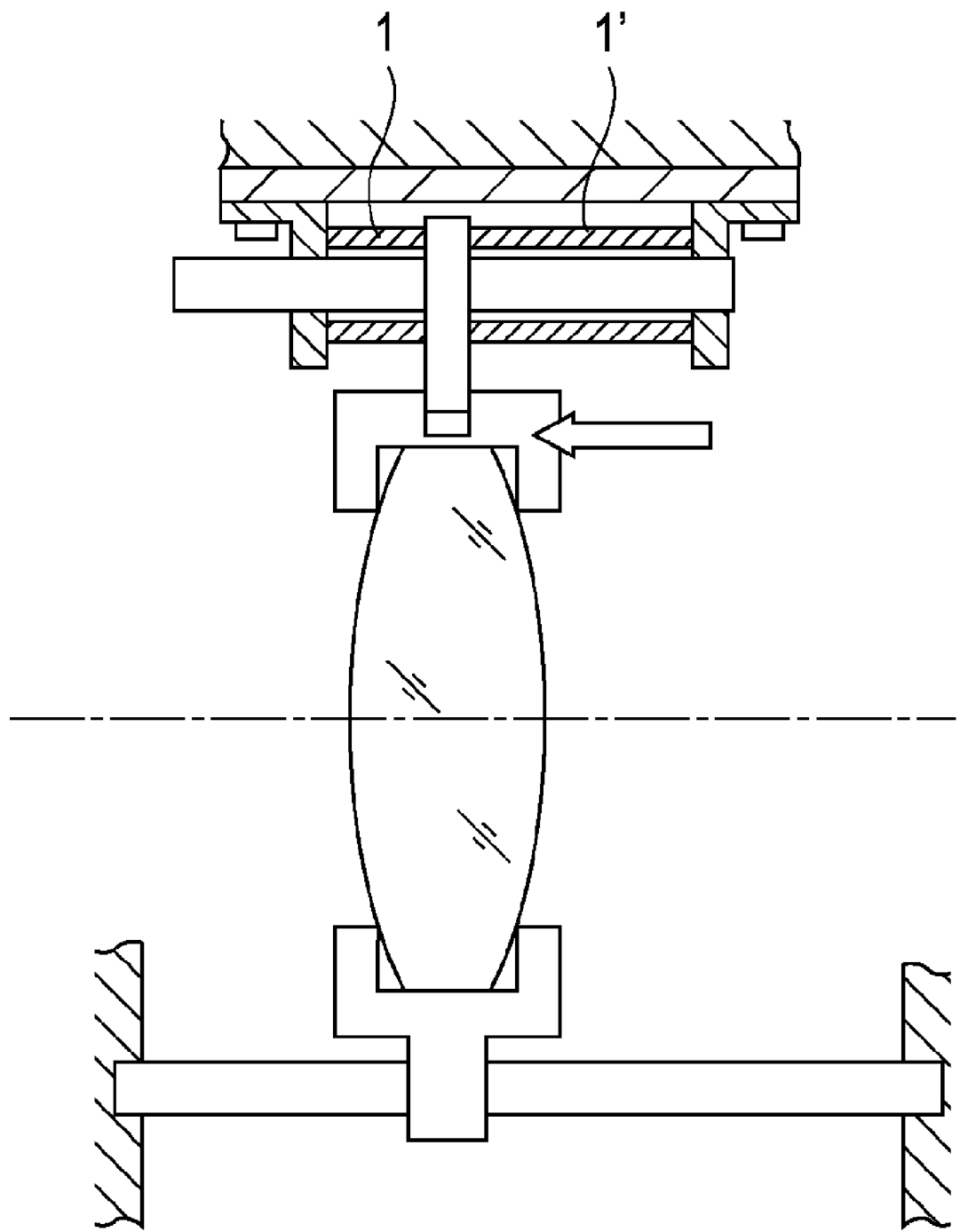
Figure 19:
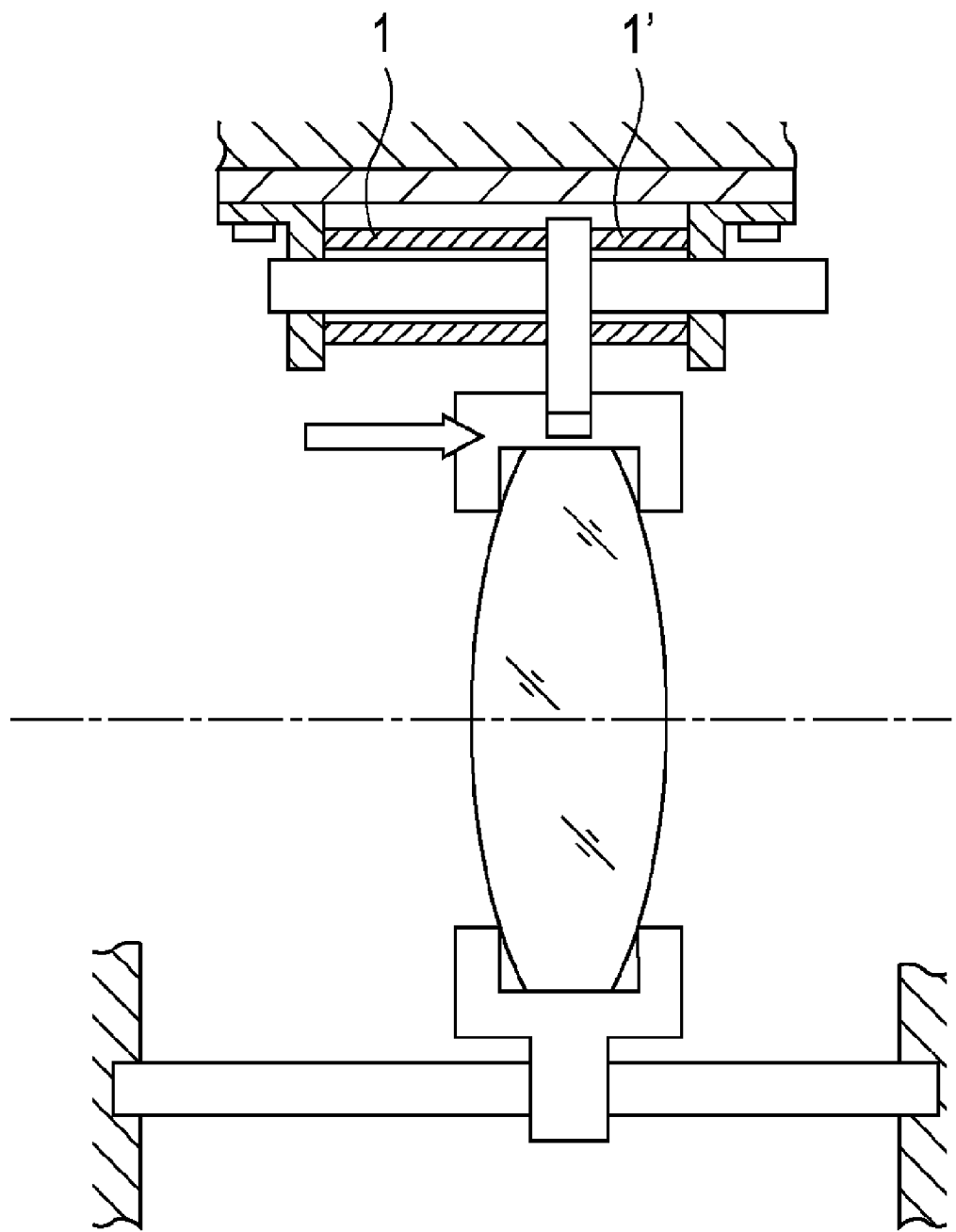

FIGS. 17, 18, and 19 illustrate the lens-driving mechanism including the actuator unit according to this exemplary embodiment. In these drawings, the same reference numerals are used for components common to those in the first exemplary embodiment illustrated with reference to FIG. 14, and the descriptions thereof are omitted.

The actuator unit according to this exemplary embodiment is integrated with the lens-guiding mechanism. The key 13 of the holding member 5 is connected with the lens frame 8. The flat plate 4 is fixed to a barrel B. The holding member 3' includes a through-hole 20 as shown in FIG. 11. The through-hole 20 allows passage of air inside the actuator elements 1 and 1' during movement of the holding member 5. The holding member 3 also includes a similar through-hole. When the driving circuit 22 is operated by the control circuit 24 such that a voltage is applied to the actuator element 1', the lens is moved leftward from the state shown in FIG. 17 to the state shown in FIG. 18. On the other hand, when the driving circuit 22 is operated by the control circuit 24 such that a voltage is applied to the actuator element 1, the lens is moved rightward from the state shown in FIG. 17 to the state shown in FIG. 19.

According to this exemplary embodiment, the lens sleeve and the actuator are integrated with each other, and thus a small lens barrel can be realized. Moreover, removal of helical compression springs can reduce detrimental effects on driving performance characteristics such as hysteresis and repeatability, durability, and reliability characteristics such as electrostatic breakdown strength caused by the known springs.

Fourth Exemplary Embodiment

Figure 12:
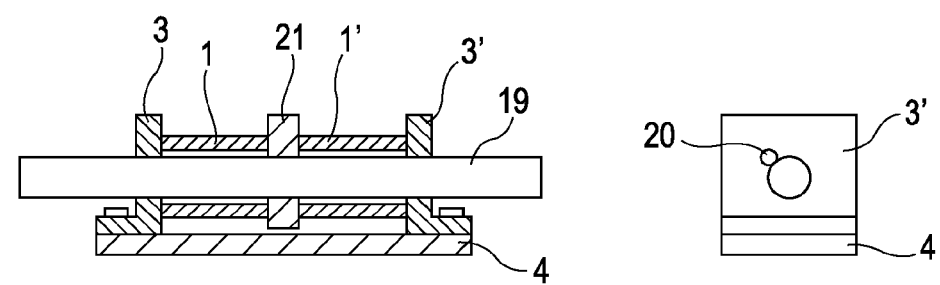

A fourth exemplary embodiment will now be described with reference to FIGS. 12, 20, 21, and 22. FIG. 12 illustrates the structure of the actuator according to the fourth exemplary embodiment. As shown in FIG. 12, the structure of the actuator unit is the same as that of the actuator unit according to the third exemplary embodiment except that a connecting member 21 does not have a key.

Figure 20:
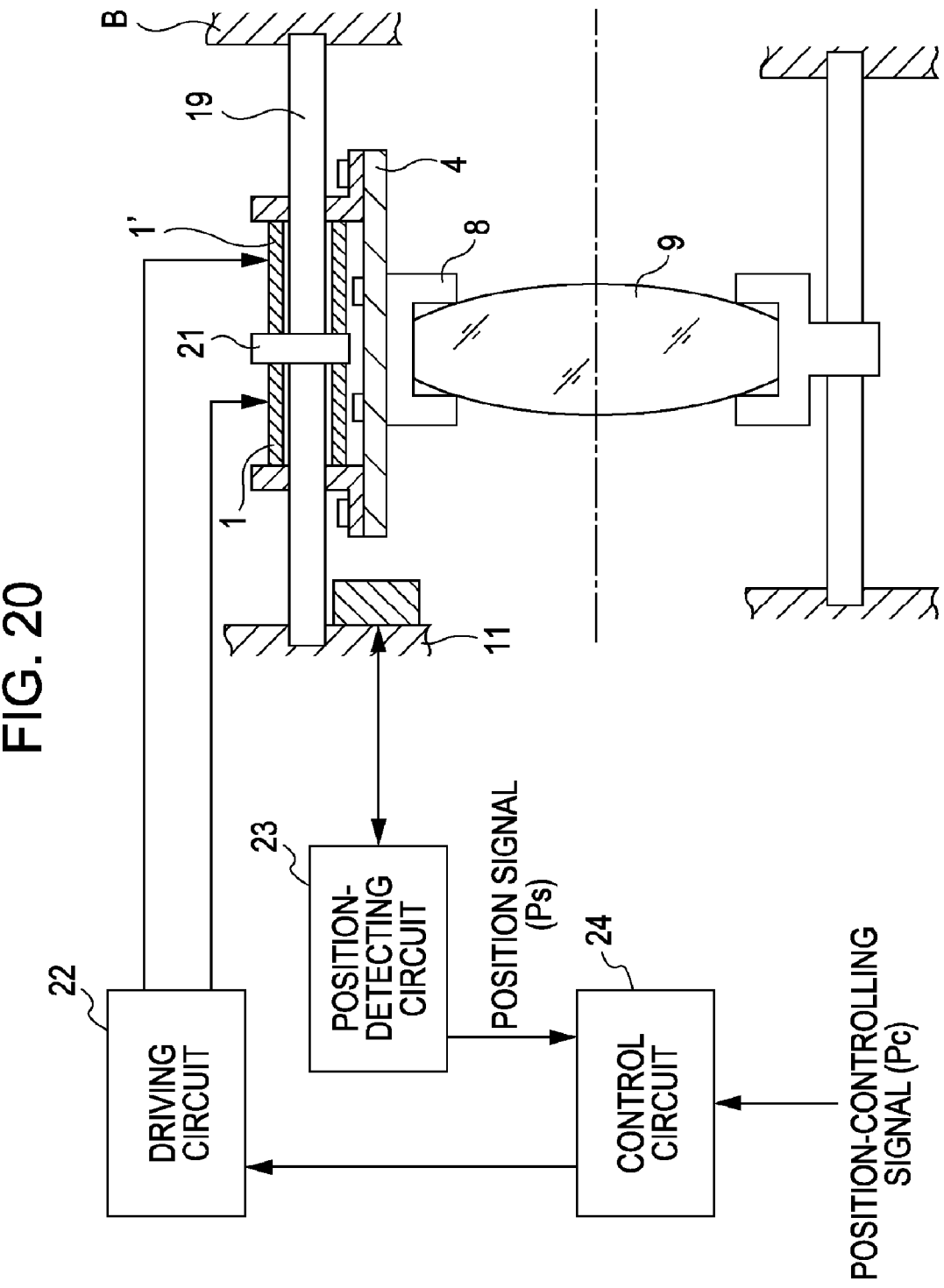
FIGS. 20 to 22 illustrate a lens-driving mechanism according to the fourth exemplary embodiment of the present invention.
Figure 21:
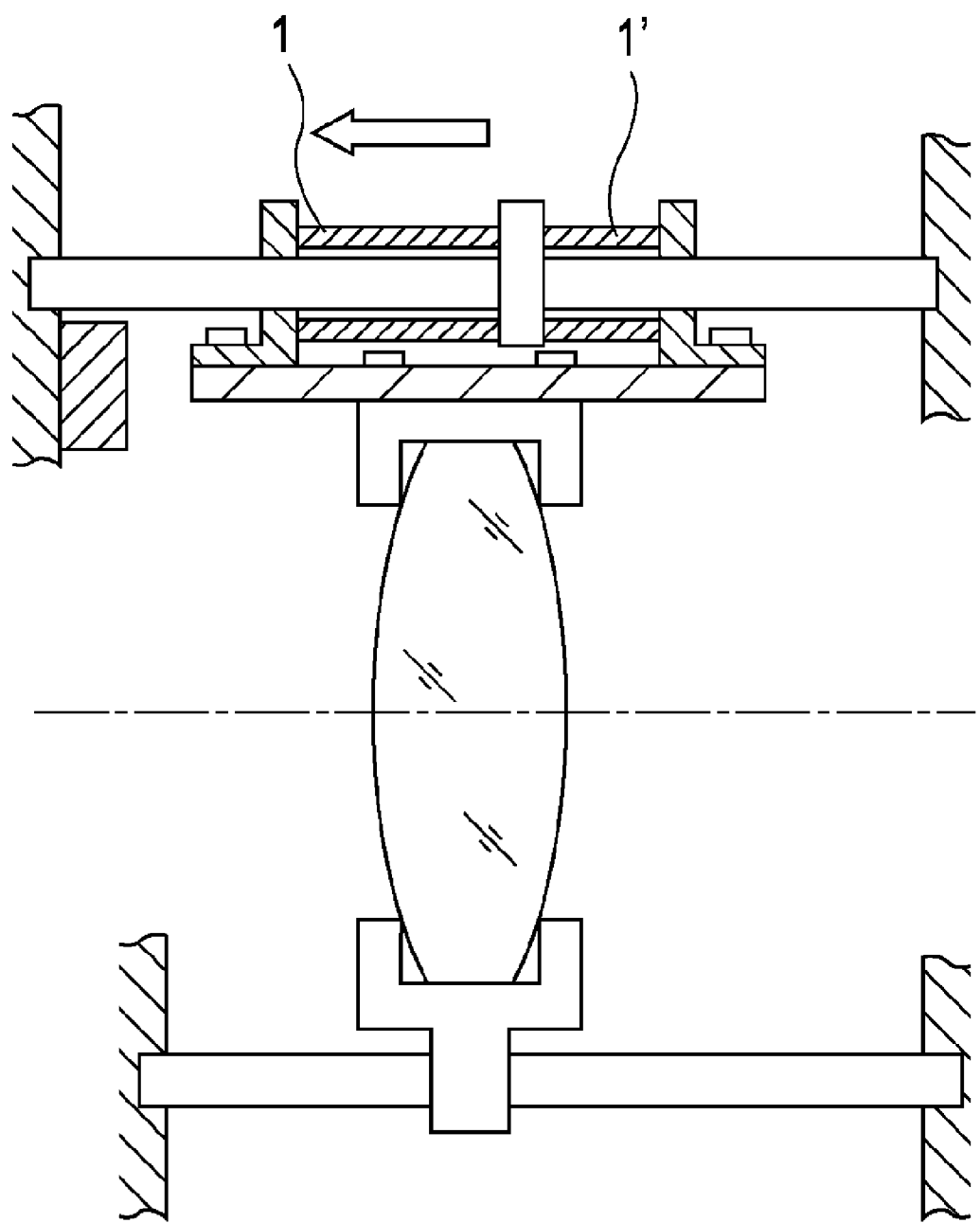
Figure 22:
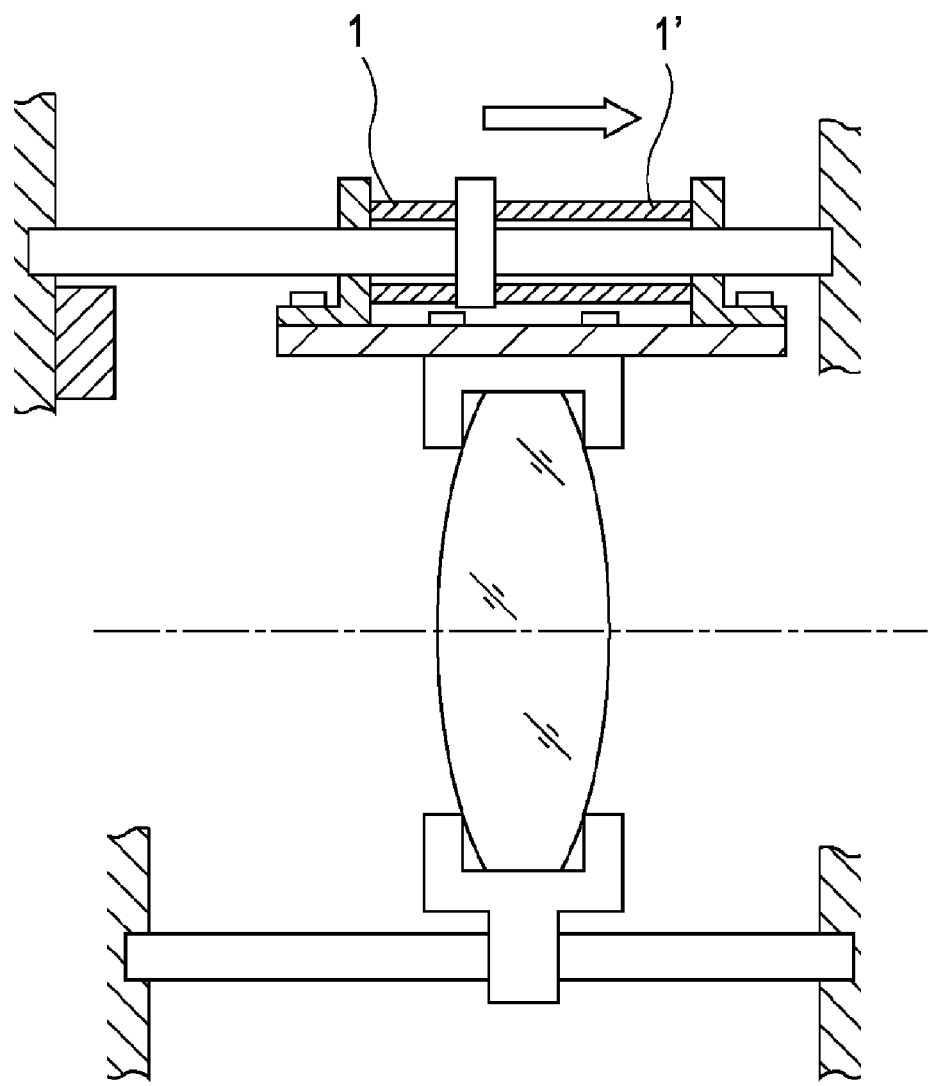

FIGS. 20, 21, and 22 illustrate the lens-driving mechanism including the actuator unit according to this exemplary embodiment. As shown in FIG. 20, the actuator unit according to this exemplary embodiment is integrated with the lens-guiding mechanism such as the sleeve 6 described in the first exemplary embodiment. The flat plate 4 is connected with the lens frame 8. The flat plate 4 and the lens frame 8 may be molded in one piece by injection molding. The shaft 19 is fixed to the barrel B, and the connecting member 21 that is integrated with the shaft 19 does not move. The holding member 3' includes the through-hole 20 that allows passage of air inside the actuator elements 1 and 1' during movement of the connecting member 21. The holding member 3 also includes a similar through-hole. When the driving circuit 22 is operated by the control circuit 24 such that a voltage is applied to the actuator element 1', the lens is moved leftward from the state shown in FIG. 20 to the state shown in FIG. 21. On the other hand, when the driving circuit 22 is operated by the control circuit 24 such that a voltage is applied to the actuator element 1, the lens is moved rightward from the state shown in FIG. 20 to the state shown in FIG. 22. In this exemplary embodiment, the driving force generated by extension or contraction of the actuator elements 1 and 1' is transmitted via the flat plate 4 disposed at the side surface of the actuator as in the first exemplary embodiment.

According to this exemplary embodiment, the lens sleeve and the actuator are integrated with each other, and thus a small lens barrel can be realized. Moreover, removal of helical compression springs can reduce detrimental effects on driving performance characteristics such as hysteresis and repeatability, durability, and reliability characteristics such as electrostatic breakdown strength caused by the contact of the actuator elements (films) with the known springs.

Fifth Exemplary Embodiment

Next, a fifth exemplary embodiment will be described with reference to FIGS. 25, 26, and 27.

In this exemplary embodiment, one of the actuator elements 1 and 1' according to the first to fourth exemplary embodiments is replaced with a helical extension spring such that the actuator unit has only one actuator element in the output portion. The initial position of the actuator element is set adjacent to an end of the stroke. Structures other than this are the same as in the first to fourth exemplary embodiments. In this exemplary embodiment, the actuator element 1' according to the third exemplary embodiment (FIG. 11) is replaced with a helical spring, but one of the actuator elements according to the first, second, and fourth exemplary embodiments may be replaced with a helical spring.

Figure 25:
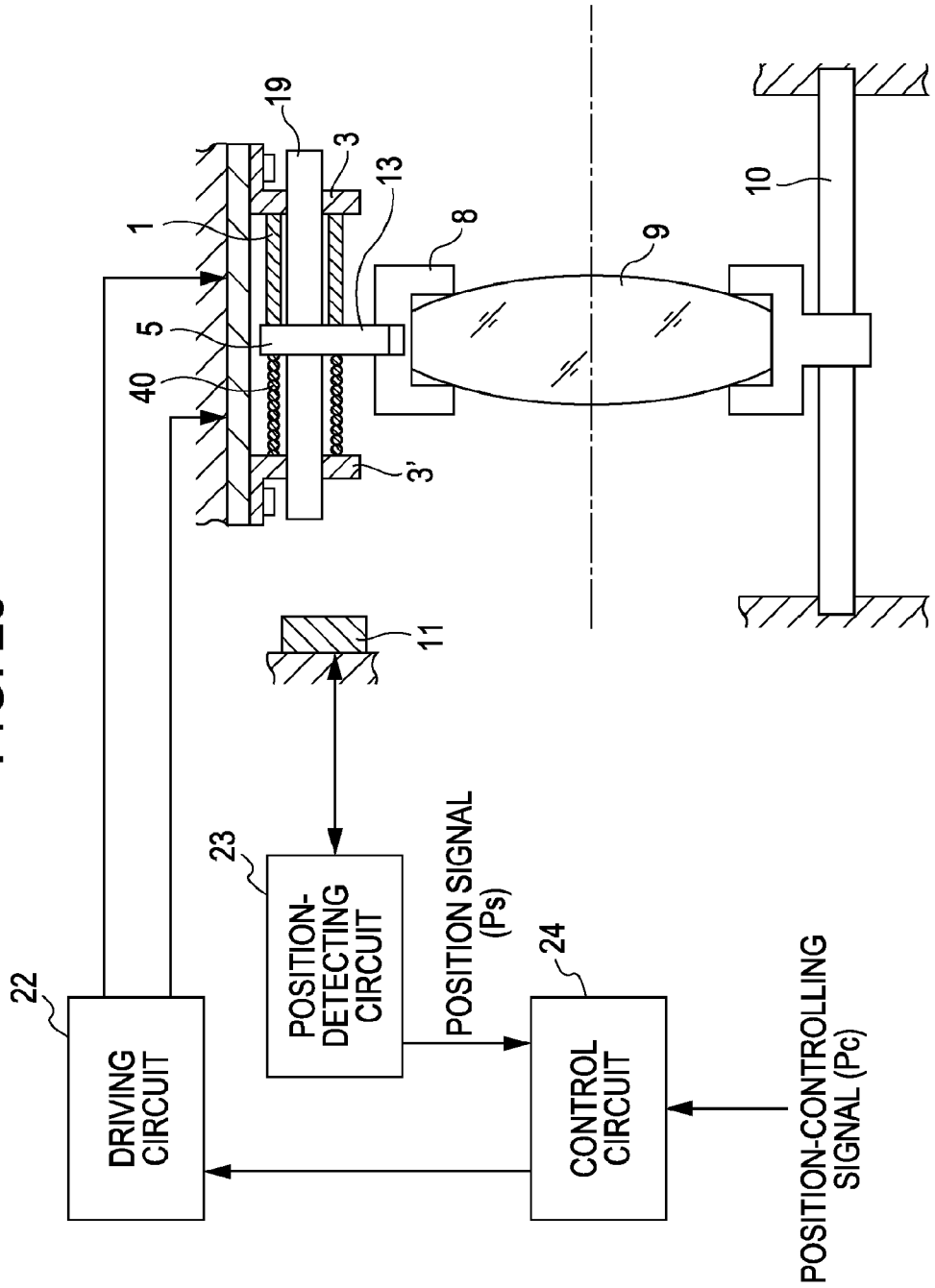
FIGS. 25 and 26 illustrate a lens-driving mechanism according to a fifth exemplary embodiment of the present invention.
Figure 26:
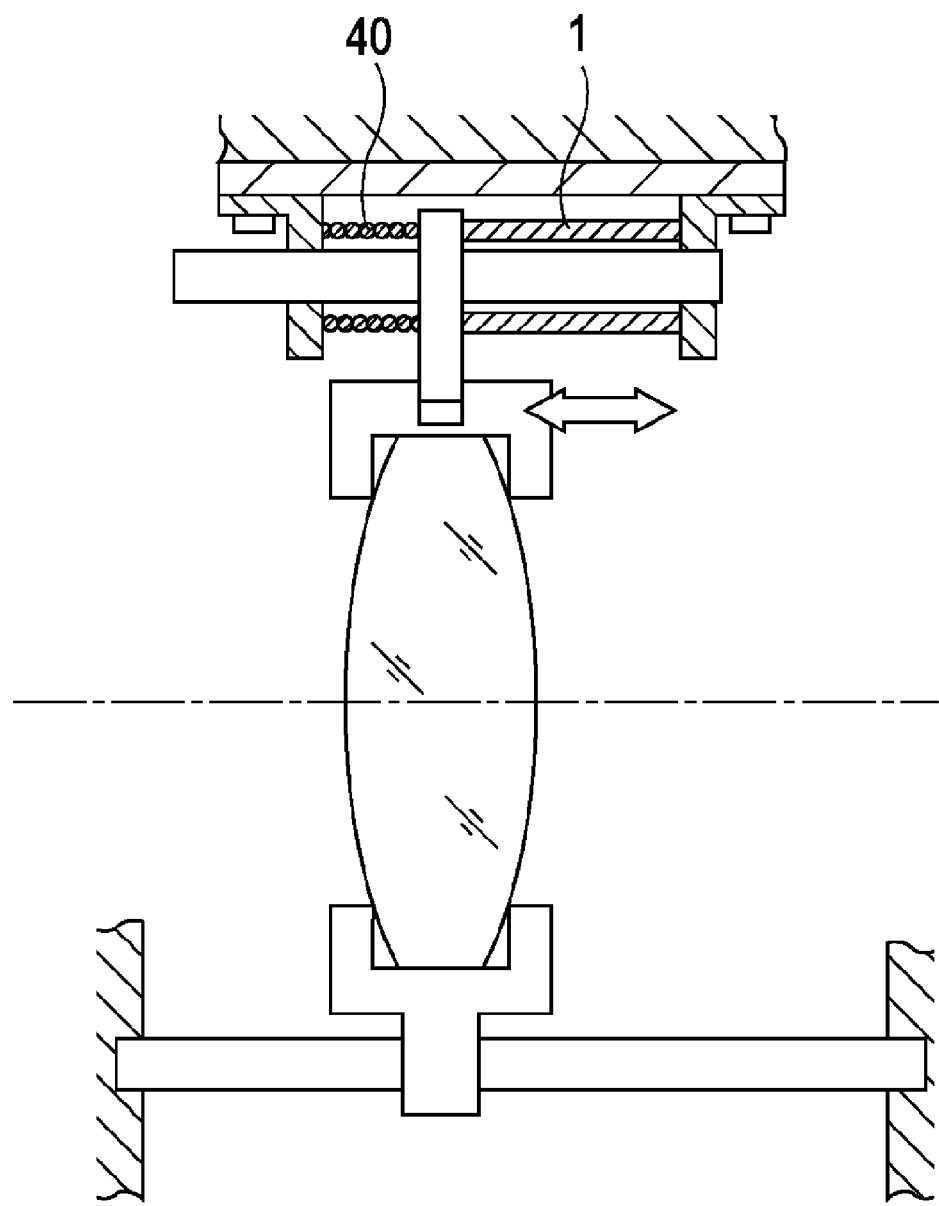

In FIGS. 25 and 26, the holding members 3, 3', and 5 and the shaft 19 are mechanical components for holding the actuator element 1 and a helical extension spring 40, and both ends of the actuator element 1 and those of the helical spring are bonded to the corresponding holding members. Moreover, the holding member 5 includes the key 13 so as to be mechanically connected with the lens frame 8. In this exemplary embodiment, the driving force of the actuator is transmitted via the key 13. The flat plate 4 and the helical extension spring 40 apply prestrain to the actuator element 1. The lens 9 held by the lens frame 8 is guided by the guiding shaft 10 and the shaft 19 so as to be moved in the optical-axis direction. The detecting sensor 11 detects the position of the lens. The key 13 of the holding member 5 is connected with the lens frame 8 so as to transmit the driving force of the actuator unit to the lens frame 8. As shown in FIG. 13, the position of the key 13 can be changed with respect to the attachment face when it is assembled into the actuator unit, resulting in higher flexibility regarding the shapes and the positions of the barrel and the attachment face to which the unit is attached. Moreover, the mechanism shown in this exemplary embodiment can be used for driving the above-described movable focus lens or the above-described movable zoom lens, but the application is not limited to these.

FIG. 25 illustrates the structure of the lens-driving mechanism and a circuit block diagram. Voltage is applied to the actuator element (film) 1 by the driving circuit 22. The position-detecting circuit 23 transmits signals output from the detecting sensor 11 to the control circuit 24. The detecting sensor 11 may be an external type such as a photodetector, or may be an embedded type such as a capacitance detector. The control circuit 24 monitors signals output from the position-detecting circuit 23, and controls voltage that is applied to the actuator element 1 on the basis of signals for controlling the lens position. The signals for controlling the lens position are information on the target position of the lens for, for example, autofocusing and zooming.

Figure 27:
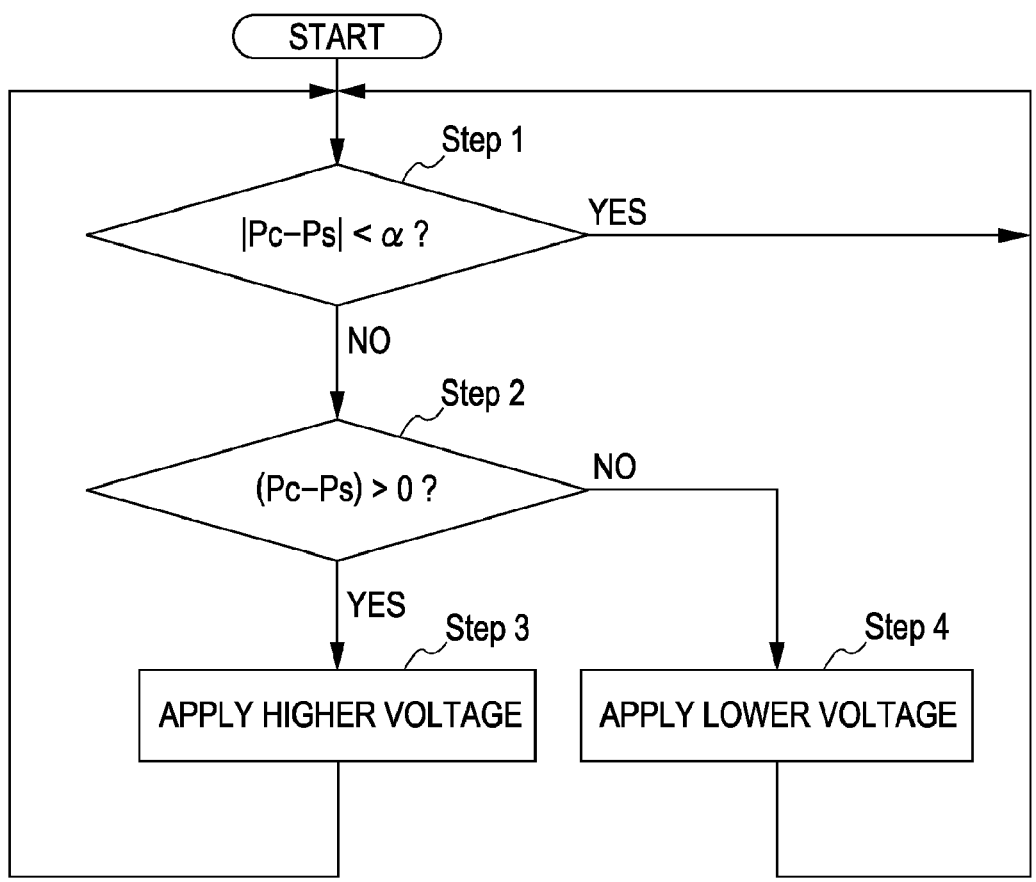
FIG. 27 is a flow chart illustrating operations of driving control according to the fifth exemplary embodiment of the present invention.

FIG. 27 illustrates a flow chart for controlling the drive of the lens.

Step 1: The control circuit 24 compares the position-controlling signal Pc, which is the information on the target position of the lens, with the position signal Ps output from the position-detecting sensor. When the absolute value of the difference between Pc and Ps is less than the predetermined value α, the process returns to START. When the absolute value of the difference between Pc and Ps is larger than α, the process proceeds to Step 2. In the cases of autofocusing and zooming, for example, the predetermined value α is defined by multiplying an allowable diameter of a circle of confusion by an F-number, and then multiplying the resultant value by a predetermined constant.

Step 2: The difference between Pc and Ps is determined whether it is positive or negative. When the difference between Pc and Ps is positive, the process proceeds to Step 3, and higher voltage is applied to the actuator element 1. On the other hand, when the difference between Pc and Ps is negative, the process proceeds to Step 4, and lower voltage is applied to the actuator element 1. Steps 1 to 4 are performed at predetermined time intervals such that the actuator element 1 is driven, thereby controlling the lens position.

Next, setting of the initial position of the actuator according to the present invention will be described.

The key 13 of the actuator according to this exemplary embodiment is connected with the lens frame 8 so as to drive the lens. In the initial state where no voltage is applied to the actuator element 1, the lens position can be maintained by the elastic force of the actuator element 1 and the helical extension spring 40. Normally, focus lens units return the lenses to predetermined positions (resetting operation) when powering on due to the lens drive using stepping motors. The actuator according to this exemplary embodiment can omit this resetting operation. Moreover, no power is required for positioning the actuator at the initial position, resulting in power savings. In this exemplary embodiment, the initial reset position is set adjacent to an end of the focus stroke. That is, the actuator is fixed to the lens barrel such that the lens position when the key 13 is connected to the lens frame 8 while no voltage is applied to the actuator is at the end of the focus stroke. Similarly, another actuator is fixed to the lens barrel such that the position of the zoom lens is at an end of the zoom stroke for driving the zoom lens. Moreover, when the actuator unit is fixed inside the lens barrel, all or a part of the components of the actuator may have black matt surfaces such that light beams reflected from the actuator unit do not form ghost images.

According to this exemplary embodiment, the layout of the actuator installed inside the lens barrel can be performed with higher flexibility, and dead space can be reduced. Thus, a small lens barrel can be realized. Moreover, a helical spring provided aside from the actuator element 1 can reduce detrimental effects on driving performance characteristics such as hysteresis and repeatability, durability, and reliability characteristics such as electrostatic breakdown strength caused by the contact of the film with the spring. Furthermore, the connection of the key and the lens frame can stabilize the direction of force obtained from the actuator, resulting in an excellent driving performance.

Sixth Exemplary Embodiment

Next, a sixth exemplary embodiment will be described with reference to FIGS. 28, 29, 30A, and 30B.

Figure 28:
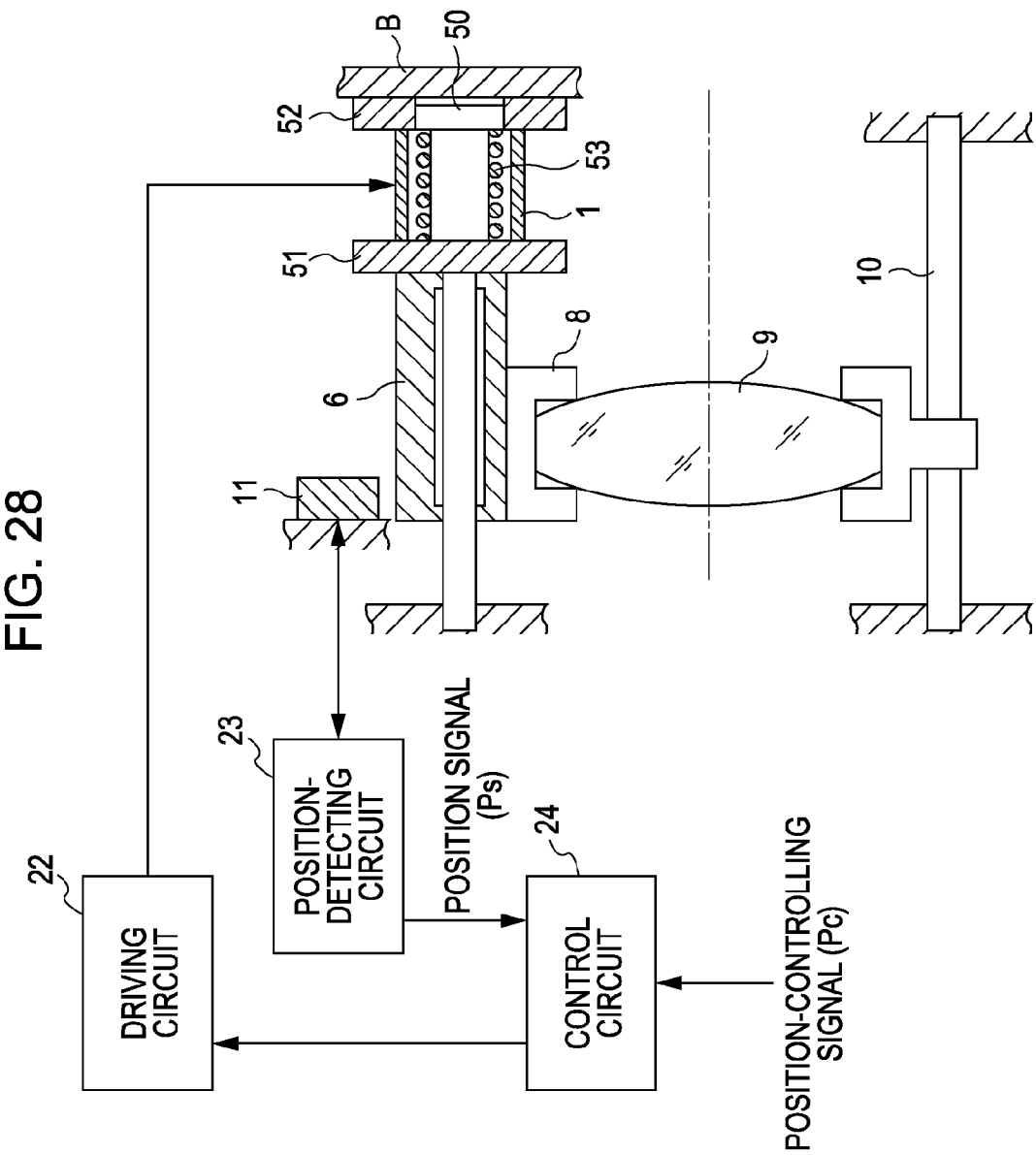
FIGS. 28 to 30 illustrate a lens-driving mechanism according to a sixth exemplary embodiment of the present invention.
Figure 29:
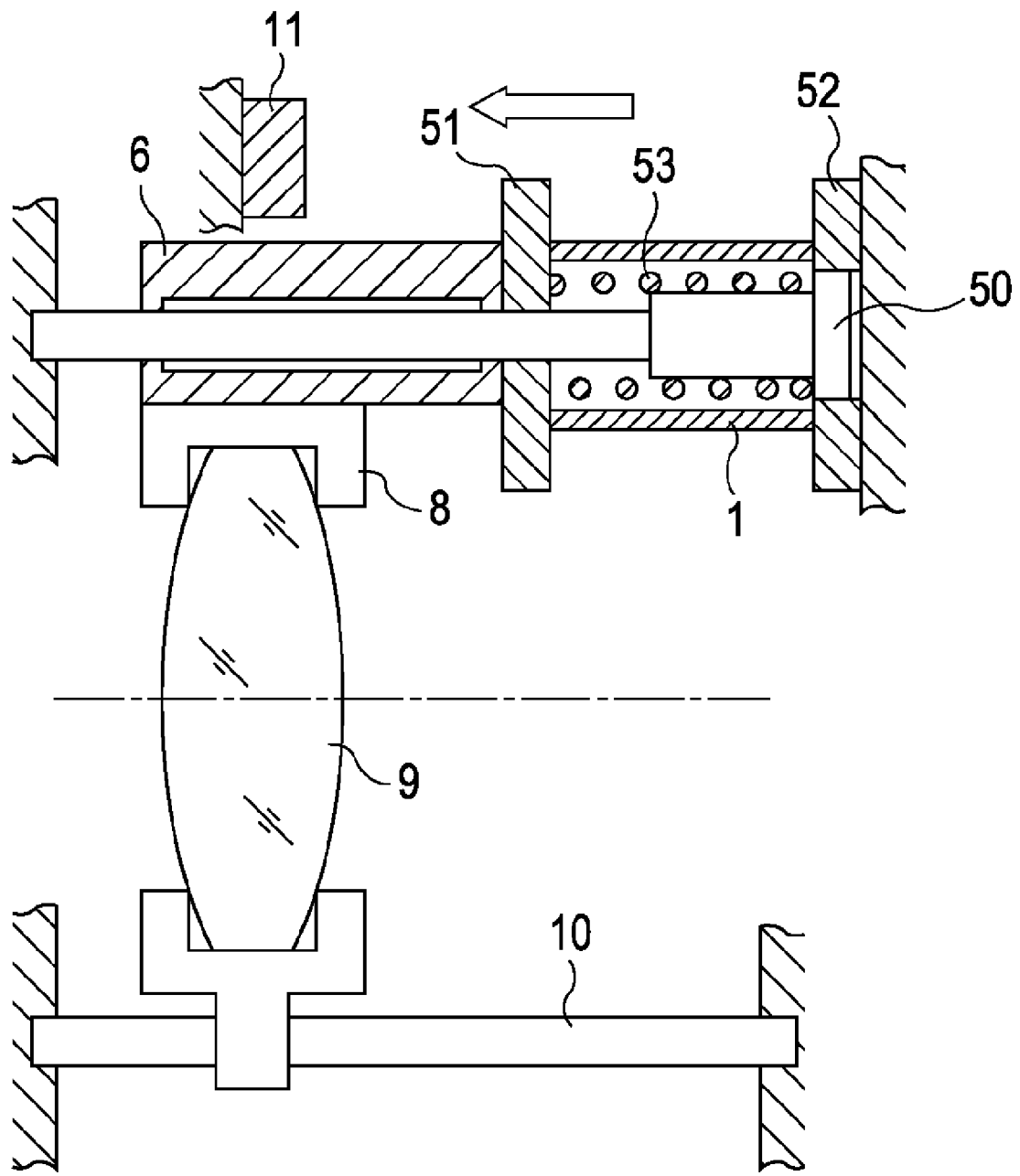
Figure 30A:
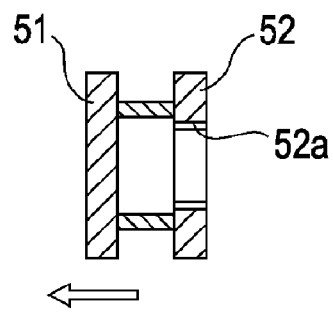
Figure 30B:
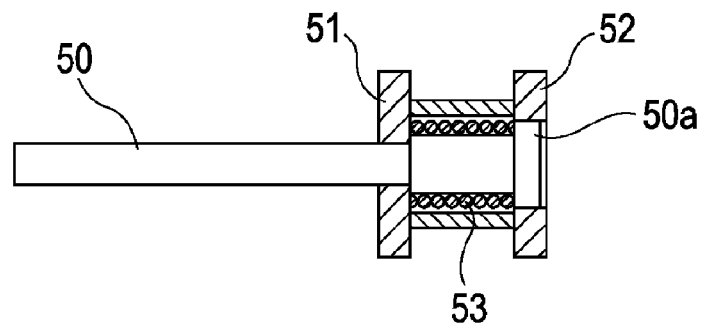

According to this exemplary embodiment, the lens sleeve is operated by the displacement and the force of one electroactive polymer. As shown in FIG. 30A, the actuator element 1 is bonded to holding members 51 and 52. A helical compression spring 53 and a stepped shaft 50 shown in FIGS. 28, 29, and 30B are inserted into a tapped hole 52a of the holding member 52, and a threaded portion 50a of the stepped shaft 50 is screwed into the tapped hole 52a. This leads to the state shown in FIG. 30B where the actuator element 1 is prestrained. The material of the actuator element 1 is the same as in the other exemplary embodiments. In this exemplary embodiment, the spring is disposed between the actuator element and the shaft, but may be disposed outside the actuator element. FIG. 28 illustrates the state of the actuator unit incorporated in the lens-driving mechanism. The holding member 51 is fixed to the sleeve 6 by bonding or screwing. The holding member 52 is fixed to the barrel B by bonding or screwing. FIG. 28 illustrates the initial state when no voltage is applied to the actuator element 1. In this initial state, the actuator unit is at an end of the focus stroke when using a focus lens, and at an end of the zoom stroke when using a zoom lens.

FIG. 29 illustrates the state when a voltage is applied to the actuator element 1. When a voltage is applied to the actuator element 1, the actuator element 1 is extended in the direction of the arrow shown in FIG. 29 from the state shown in FIG. 28. With this, the actuator pushes the sleeve 6 such that the lens is moved leftward as shown in FIG. 29. The control of the lens drive is the same as that described in the flow chart shown in FIG. 27. Moreover, the actuator element 1 may be directly bonded to the sleeve 6 without using the holding member 51.

Seventh Exemplary Embodiment

Figure 31:
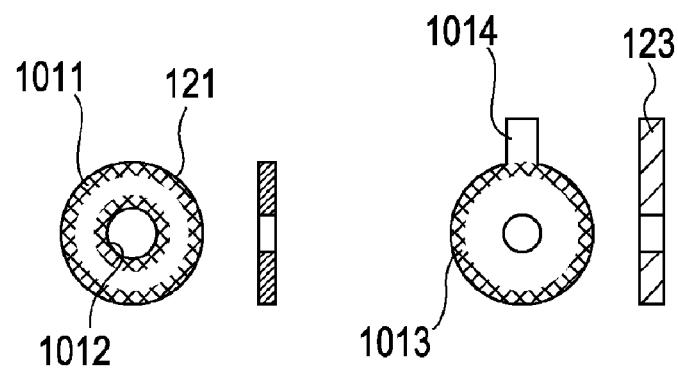
FIGS. 31 to 33 illustrate the structures of actuators according to a seventh exemplary embodiment of the present invention.
Figure 32:
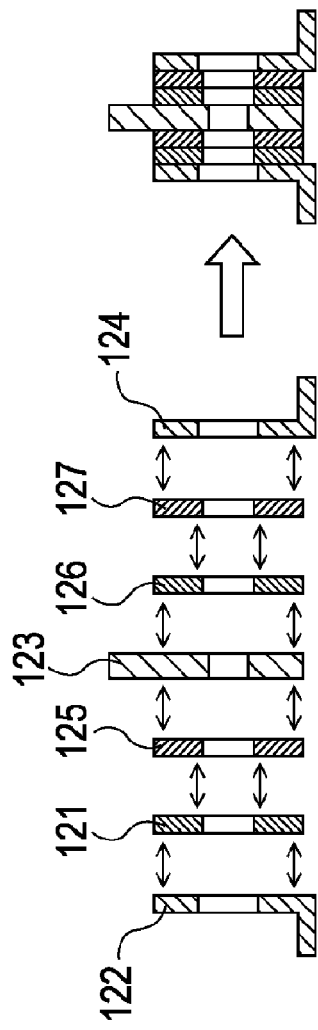
Figure 33:
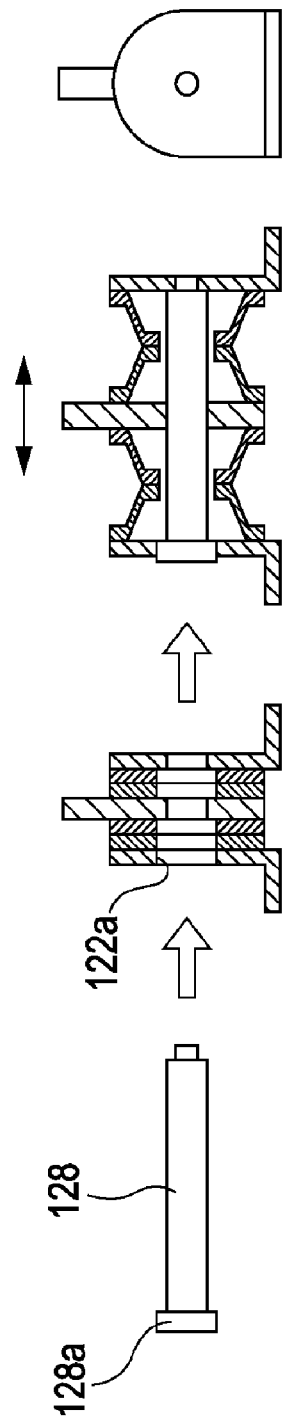

FIGS. 31 to 33 illustrate the structure of an actuator according to a seventh exemplary embodiment. In these drawings, reference numerals 121, 125, 126, and 127 denote ring-shaped sheets of actuator elements having the same size and composed of an electroactive polymer. Holding members 122, 123, and 124 are mechanical components for holding the actuator elements 121, 125, 126, and 127. The actuator elements 121, 125, 126, and 127 are fixed to the holding members by welding or bonding. Crosshatched regions shown in FIG. 31 are portions to be welded or bonded. Positions to be welded or bonded in the entire components are indicated by double-headed arrows shown in FIG. 32. The actuator element 121 is welded or bonded to the holding member 122 at a crosshatched region 1011 adjacent to the outer circumference of the ring-shaped actuator element 121. Furthermore, the actuator elements 121 and 125 are welded or bonded to each other at a crosshatched region 1012 adjacent to the inner circumference of the ring-shaped actuator elements 121 and 125. The holding member 123 is welded or bonded to the actuator element 125 at a crosshatched region 1013 adjacent to the outer circumference of the ring-shaped holding member 123. The same applies to the actuator elements 126 and 127. Thus, the actuator elements form a bellows shape. After the components are welded or bonded as shown in FIG. 32, the unit is fixed using a stepped shaft 128 while the gap between the holding members 122 and 124 is extended to a predetermined length as shown in FIG. 33. A threaded portion 128a of the stepped shaft 128 is screwed into a threaded portion 122a of the holding member 122, and furthermore, is locked using an adhesive. The holding member 123 can slide on the stepped shaft 128 with low friction. Either or both of the stepped shaft 128 and the holding member 123 may be covered with a low-friction coating such as Teflon, or may be covered with a lubricant such as a commercial grease. This exemplary embodiment does not necessarily employ the stepped shaft 128, but may employ a flat plate as in the first exemplary embodiment so as to determine the total length of the actuator unit. The stepped shaft 128 prestrains the actuator elements 121, 125, 126, and 127, and the actuator elements are fixed while being extended.

According to this exemplary embodiment, the gap between the holding members 122 and 124 is maintained while the actuator elements 121, 125, 126, and 127 are extended by the stepped shaft 128, and the force and the displacement of the actuator elements are smoothly transmitted via the center of the side surface of the bellows structure. In this exemplary embodiment, the holding member 123 includes a key 1014 that is mechanically connected with a load such as a lens-holding frame such that the driving force of the actuator is transmitted via the key 1014. In this exemplary embodiment, four circular sheets of the actuator elements are employed, but only two sheets of the actuator elements 121 and 127, for example, may be employed. Furthermore, a plurality of sheets (six, eight, ten, and the like) instead of four sheets may be connected to each other in the same manner. The number of sheets can be set according to the operating conditions. Moreover, the fixing portion of the actuator elements 121 and 125 and the fixing portion of the actuator elements 126 and 127 are disposed adjacent to the inner circumference of the ring-shaped actuator elements, but may be disposed adjacent to the outer circumference of the ring-shaped actuator elements. In this case, the fixing portions of the holding member 122 and the actuator element 121, the actuator element 125 and the holding member 123, the holding member 123 and the actuator element 126, and the actuator element 127 and the holding member 124 may be disposed adjacent to the inner circumference of the ring-shaped actuator elements.

Moreover, the polarities of electrodes are set such that the outer side of the actuator element is grounded and a high voltage is applied to the inner side. With this structure, electric discharges and the like to other components in the barrel can be prevented.

Next, the lens-driving mechanism including a polymer actuator unit according to the seventh exemplary embodiment will be described with reference to FIG. 34. In FIG. 34, the lens 9 held by the frame 8 can move together with the sleeve 6 along the guiding shafts 7 and 10. The detecting sensor 11 detects the position of the lens. The key 1014 of the holding member 123 is connected with the sleeve 6 so as to transmit the driving force of the actuator unit to the lens frame 8. The mechanism shown in this exemplary embodiment can be used for driving the movable focus lens or the movable zoom lens, but the application is not limited to these.

Next, operations of the lens-driving mechanism will be described with reference to FIG. 34.

Voltages are independently applied to the actuator elements 121, 125, 126, and 127 by the driving circuit 22. For example, when a voltage is applied to the actuator element 121, the actuator element 121 is pushed by the Coulomb force generated between the electrodes according to the above-described principle, and the actuator element (film) 121 is expanded in the outer circumferential direction. As a result, according to the structure of this exemplary embodiment, the actuator element 121 is extended rightward in FIG. 34, and the holding member 123 is moved rightward. When a voltage is also applied to the actuator element 125, the holding member 123 is further moved rightward in the drawing. In order to move the holding member 123 leftward, voltages are applied to the actuator elements 126 and 127. The position-detecting circuit 23 transmits signals output from the detecting sensor 11 to the control circuit 24. The detecting sensor 11 may be an external type such as a photodetector, or may be an embedded type such as a capacitance detector described above. The control circuit 24 monitors signals output from the position-detecting circuit 23, and controls voltage that is applied to the actuator elements on the basis of signals for controlling the lens position. The signals for controlling the lens position are information on the target position of the lens for, for example, autofocusing and zooming. The flow chart for controlling the drive of the lens is the same as that in the other exemplary embodiments, and the descriptions thereof are omitted.

Next, setting of the initial position of the actuator according to the present invention will be described.

The key 1014 of the actuator according to this exemplary embodiment is connected with the sleeve 6 so as to drive the lens. In the initial state where no voltage is applied to the actuator elements 121, 125, 126, and 127, the lens position can be maintained by the elastic force of the actuator elements. Normally, known devices for driving focus lenses using stepping motors return the lenses to predetermined positions (resetting operation) when powering on. The actuator according to this exemplary embodiment can omit this resetting operation. Moreover, no power is required for positioning the actuator at the initial position, resulting in power savings. In this exemplary embodiment, the initial reset position is set at the midpoint of the focus stroke. That is, the actuator is fixed to the lens barrel such that the lens position when the key 1014 is connected to the sleeve 6 while no voltage is applied to the actuator is at the midpoint of the focus stroke. Similarly, another actuator is fixed to the lens barrel such that the position of the zoom lens is at the midpoint of the zoom stroke for driving the zoom lens. The initial position is not limited to the midpoint, but may be a predetermined position according to conditions favorable for the camera system.

Moreover, the actuator according to this exemplary embodiment may employ the cylindrical polymer actuators according to the first to sixth exemplary embodiment instead of the circular sheet actuators.

Moreover, when the actuator according to this exemplary embodiment is fixed inside the lens barrel, all or a part of the components of the actuator may have black matt surfaces such that light beams reflected from the actuator unit do not form ghost images.

According to the above-described exemplary embodiments, the layout of the actuator installed inside the lens barrel can be performed with higher flexibility, and dead space can be reduced. Thus, a small lens barrel can be realized. Moreover, removal of helical compression springs can reduce detrimental effects on driving performance characteristics such as hysteresis and repeatability, durability, and reliability characteristics such as electrostatic breakdown strength caused by the known springs. Furthermore, the connection of the key and the sleeve serving as a guiding member of the movable lens groups can stabilize the direction of force obtained from the actuator, resulting in an excellent driving performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An optical device comprising:
a lens holder that holds a lens and is movable in the optical-axis direction of the lens; and
an actuator that moves the lens holder in the optical-axis direction, the actuator including an actuator element composed of an electroactive polymer, an actuator-element holder that holds the actuator element, a mechanism that applies prestrain to the actuator element, and a connecting member that connects the lens holder and the actuator, wherein
a connecting portion of the connecting member is disposed adjacent to the side surface of the actuator element, and wherein the prestrain to the actuator element is applied in a direction to which the lens holder moves.

2. The optical device according to claim 1, wherein the mechanism includes a flat plate.

3. The optical device according to claim 1, wherein the mechanism includes a stepped shaft.

4. The optical device according to claim 1, wherein the actuator further includes another actuator element.

5. The optical device according to claim 1, wherein the actuator element is tubular.

6. The optical device according to claim 1, wherein
the actuator element is one or more ring-shaped sheet actuator elements; and
the actuator elements are connected to form a bellows shape.

* * * * *